United States Patent
Hildreth

(10) Patent No.: US 8,382,364 B2
(45) Date of Patent: Feb. 26, 2013

(54) AUTOMATED SOLUTION MAKING

(75) Inventor: Clay Hildreth, Fishers, IN (US)

(73) Assignee: Cargill, Incorporated, Wayzata, MN (US)

( * ) Notice: Subject to any disclaimer, the term of this patent is extended or adjusted under 35 U.S.C. 154(b) by 151 days.

(21) Appl. No.: 12/388,287

(22) Filed: Feb. 18, 2009

(65) Prior Publication Data

US 2009/0155914 A1 Jun. 18, 2009

Related U.S. Application Data

(62) Division of application No. 11/190,395, filed on Jul. 27, 2005, now Pat. No. 7,810,987.

(51) Int. Cl.
*B01F 1/00* (2006.01)

(52) U.S. Cl. ...... 366/132; 366/136; 366/138; 366/152.4; 137/5; 422/281; 422/902

(58) Field of Classification Search .................. 366/132, 366/136, 27, 152.4, 138; 137/5, 88, 93; 422/261, 422/274–279, 281, 902
See application file for complete search history.

(56) References Cited

U.S. PATENT DOCUMENTS

| | | | |
|---|---|---|---|
| 3,595,438 A | 7/1971 | Daley et al. | |
| 4,026,801 A | 5/1977 | Ward | |
| 4,247,298 A | 1/1981 | Rippie | |
| 4,863,277 A | 9/1989 | Neal et al. | |
| 5,137,694 A | 8/1992 | Copeland et al. | |
| 5,590,960 A | 1/1997 | Clinton et al. | |
| 5,800,056 A | 9/1998 | Suzuki et al. | |
| 5,992,437 A | 11/1999 | Takasaki et al. | |
| 6,048,391 A | 4/2000 | De Valk et al. | |
| 6,331,255 B1 | 12/2001 | Peddicord | |
| 6,439,252 B1 | 8/2002 | Kephart | |
| 6,845,298 B2 | 1/2005 | Nelson et al. | |
| 6,966,688 B2 | 11/2005 | Lins | |
| 7,186,390 B1 | 3/2007 | Hellbusch et al. | |
| 7,810,987 B2 * | 10/2010 | Hildreth ........................ | 366/136 |

FOREIGN PATENT DOCUMENTS

| | | |
|---|---|---|
| EP | 0443741 | 8/1991 |
| FR | 2517984 | 6/1983 |
| JP | 60058231 A | 4/1985 |
| JP | 9033538 A | 2/1997 |
| JP | 10296257 A | 11/1998 |
| JP | 2000508959 A | 7/2000 |
| JP | 2001232162 A | 8/2001 |
| JP | 2001264277 A | 9/2001 |
| WO | WO2007/016135 | 2/2007 |

OTHER PUBLICATIONS

International Preliminary Report on Patentabilty of PCT/US2006/028951 mailed Jan. 29, 2008.
Extended European Search Report of European Patent Application No. 08019200.8 mailed Feb. 5, 2009.
Extended European Search Report of European Patent Application No. 08019201.6 mailed Feb. 5, 2009.
Partial International Search Report dated Dec. 4, 2006, in Application No. PCT/US2006/028951.
International Search Report and Written Opinion dated Feb. 19, 2007, in Application No. PCT/US2006/028951.

* cited by examiner

*Primary Examiner* — David Sorkin

(57) ABSTRACT

An automated solution maker is provided. The automated solution maker mixes a chemical with a solvent to a desired concentration. The concentration of the solution is monitored by measuring the conductivity of the solution. Based upon this measurement, the concentration of the solution may be adjusted.

4 Claims, 21 Drawing Sheets

AUTOMATED SOLUTION MAKING

CROSS REFERENCE TO RELATED APPLICATION

This application is a divisional application of U.S. patent application Ser. No. 11/190,395 filed on Jul. 27, 2005 now U.S. Pat. No. 7,810,987. The subject matter of the foregoing is incorporated herein by reference in its entirety.

FIELD OF THE INVENTION

The present invention relates to an apparatus used to produce chemical solutions such as a brine solution. More specifically, the invention relates to an automated apparatus for dissolving a chemical in a solvent to produce a solution of a specific concentration.

BACKGROUND OF THE INVENTION

The application of a salt solution to reduce the amount of snow and ice from roads, sidewalks, driveways and other surfaces is a common industrial practice. Salt solution is generally created by mixing rock salt and water to produce a solution. The concentration of the solution may then adjusted by adding fresh water to dilute the mixture or adding salt to concentrate the mixture. A solution of approximately 23-27% by weight is efficient for removing ice and snow (where sodium chloride is the salt). At this concentration range, the solution will melt ice and snow with an ambient temperature of approximately −10 degrees Fahrenheit. If the desired concentration is not maintained in the solution and applied in the correct amounts on the streets, accidents may occur.

One method of monitoring and adjusting the concentration of a solution is to measure the specific gravity of the solution and add fresh water to the solution until a desired specific gravity is met. This method thus correlates the specific gravity of the solution with the concentration of the solution. U.S. Pat. No. 6,439,252 discloses an apparatus and method for automatically producing large quantities of dissolved rock salt or calcium magnesium acetate (CMA) pellets in water for producing a salt solution to be used as a liquid deicer to be used for spraying roadways, sidewalks, driveways, and runways to melt snow and ice. An electronic hydrometer (a specific gravity measuring device) measures the specific gravity of the brine/water solution. If the specific gravity is too high or too low a valve is opened or closed to adjust the amount of fresh water to the mixture. In this manner the mixture is automatically adjusted to the salinity desired.

As mentioned above, methods for producing salt solutions that use specific gravity as an indicator of concentration correlate specific gravity to concentration. This correlation can, in some instances, be faulty. For example, solids such as silica, dirt, and other foreign material in the solution can affect the specific gravity of the solution and/or the reading of the measuring device. This may in turn lead to an undesired salt concentration level for the solution. In addition, measurements based on specific gravity generally are a series of separate measurements, spaced apart in time and process, rather than a continuous measurement as the progress proceeds.

Therefore, there is a need in the art for an apparatus and method that produces an accurate salt concentration level for a salt solution that is not dependent on measuring the solution's specific gravity.

BRIEF SUMMARY OF THE INVENTION

An automated apparatus for producing a solution comprising a hopper adapted to receive a chemical and a solvent, the chemical and solvent mixing to form a solution, a solution sensor for sensing a conductivity of the solution and correlating the conductivity to a concentration of the solution, and a controller for affecting the concentration of the solution based upon the sensed conductivity. More specifically, if the concentration is over a target concentration, the controller operates to decrease the concentration of the solution, if the concentration is below a target concentration, the controller operates to increase the concentration of the solution, and if the concentration is within a tolerance of the target concentration, the controller operates to divert the solution to a storage tank.

In one embodiment, the automated apparatus for producing a solution is an automated brine maker. The hopper is adapted to receive sodium chloride and fresh water. The sodium chloride is at least partially dissolved in the fresh water in the hopper to form brine. A solution sensor detects a conductivity of the solution at a measured temperature and correlates the conductivity of the solution at that temperature to a concentration curve for sodium chloride in fresh water, thereby determining a concentration of the solution. A controller operates to adjust the concentration of the solution based upon the determined concentration, as appropriate. If the concentration is over a target concentration, the controller adds fresh water to the solution. If the concentration is under a target concentration, the controller returns the solution to the hopper and more sodium chloride is dissolved in the solution. If the concentration is within a tolerance of the target concentration, the controller diverts the solution to a storage tank.

While multiple embodiments are disclosed, still other embodiments of the invention will become apparent to those skilled in the art from the following detailed description, which shows and describes illustrative embodiments of the invention. As will be realized, the invention is capable of modifications in various obvious aspects, all without departing from the spirit and scope of the invention. Accordingly, the drawings and detailed description are to be regarded as illustrative in nature and not restrictive.

DETAILED DESCRIPTION OF THE INVENTION

An automated solution maker is provided. More specifically, the present invention provides an apparatus and method of producing a solution, such as a salt solution, with a desired concentration by measuring the conductivity of the solution, determining an amount of solvent to be added to the solution, and adding the amount of solvent to the solution. The device may further be configured to separate sediment from the chemical and solvent and flush out deposited sediments. Thus, the device may be configured for separating foreign material such as undissolved silica, dirt, and gravel from the solution.

In one embodiment, the automated solution maker may be configured for producing a clean brine solution by dissolving salt into water. The automated solution maker produces a brine solution having a concentration of a desired target concentration, or equal to or greater than a target concentration.

Figure 1:
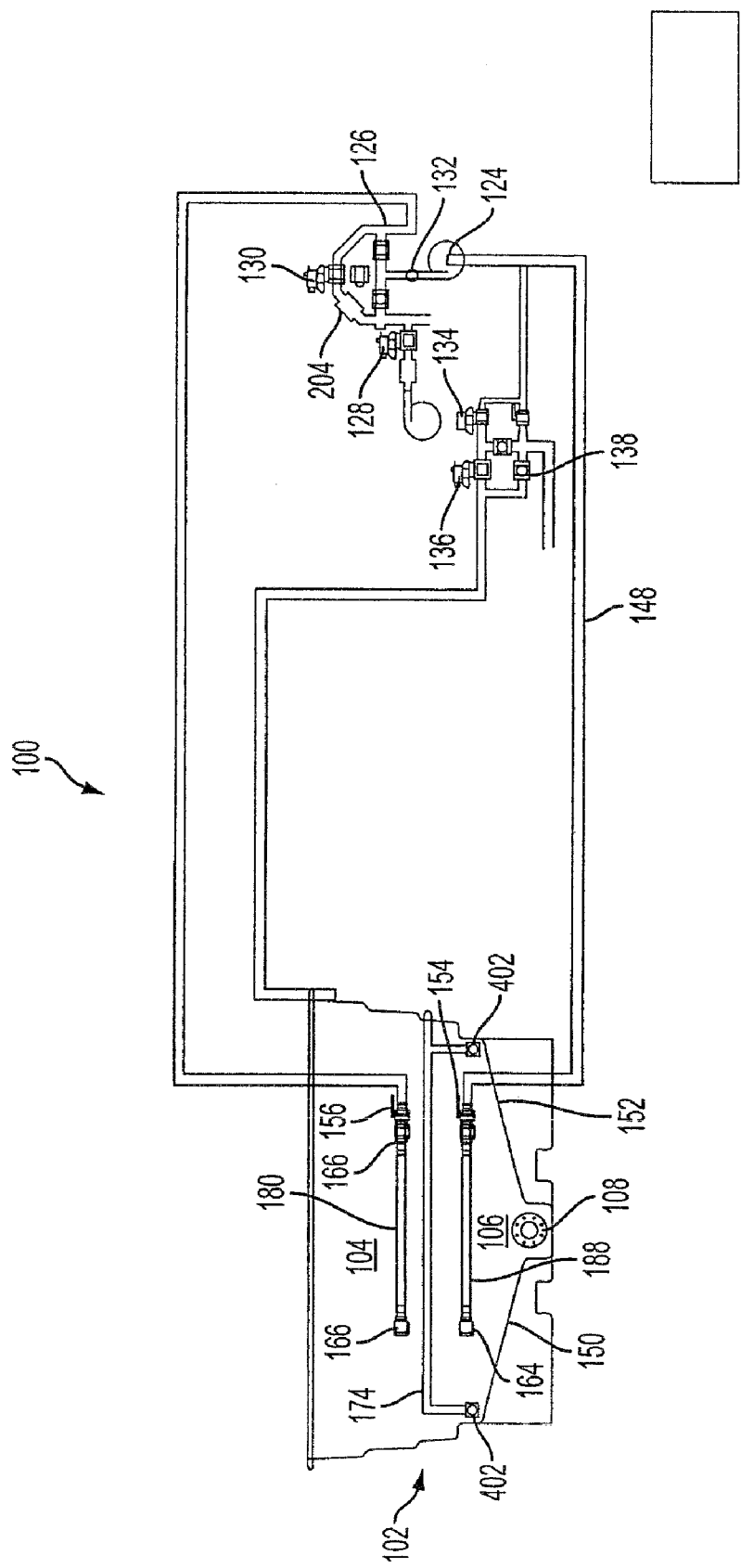
FIG. 1 illustrates a perspective view of an automated solution maker in accordance with one embodiment of the present invention.
Figure 2:
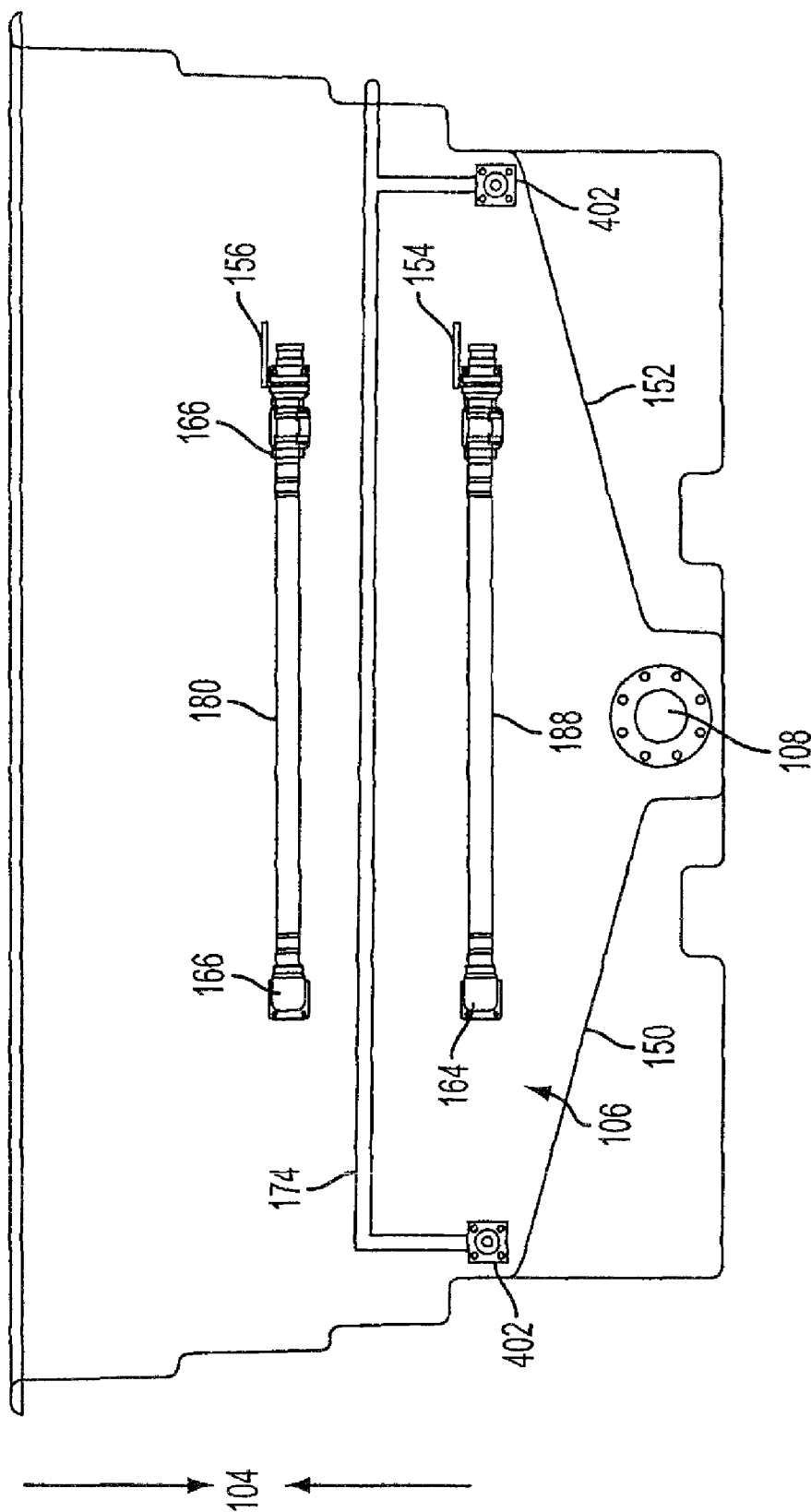
FIG. 2 illustrates a front view of a hopper of an automated solution maker in accordance with one embodiment of the present invention.
Figure 3:
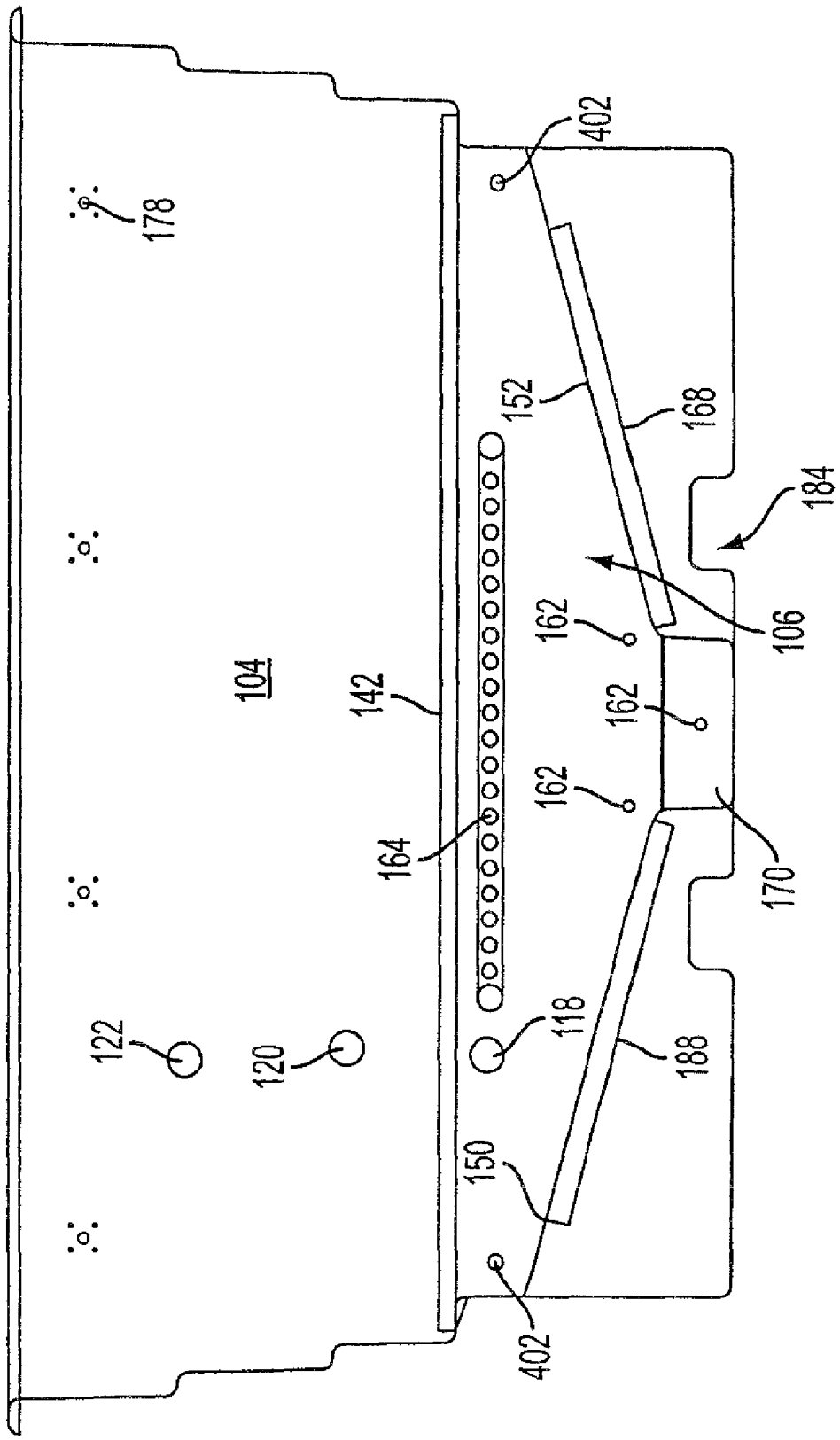
FIG. 3 illustrates a cutaway front view of a hopper of an automated solution maker in accordance with one embodiment of the present invention.

As shown in FIGS. 1 through 3, one embodiment of an automated solution maker 100 comprises a hopper 102 having a first portion 104 and a second portion 106. An example suitable capacity for the hopper 102 is five cubic yards. The first portion 104 and the second portion 106 are separated by a grate 142. The first portion 104 is adapted to receive a chemical for dissolution in a solvent to produce a solution. To produce a brine solution, the component may be, for example, sodium chloride (NaCl or salt) or calcium magnesium sulfate. The chemical may be provided in any suitable form. For example, if the chemical is salt, it may be provided in pellet or rock form. Other components may be used to produce other solutions. As will be discussed more fully below, the automated solution maker may be calibrated for use with different chemicals or solvents to produce different solutions. In one embodiment, the automated solution maker mixes sodium chloride and fresh water to produce a brine solution. The chemical in the first portion may provide a chemical bed. For example, in producing a brine solution, a salt bed may be formed in the first portion 104.

Figure 8:
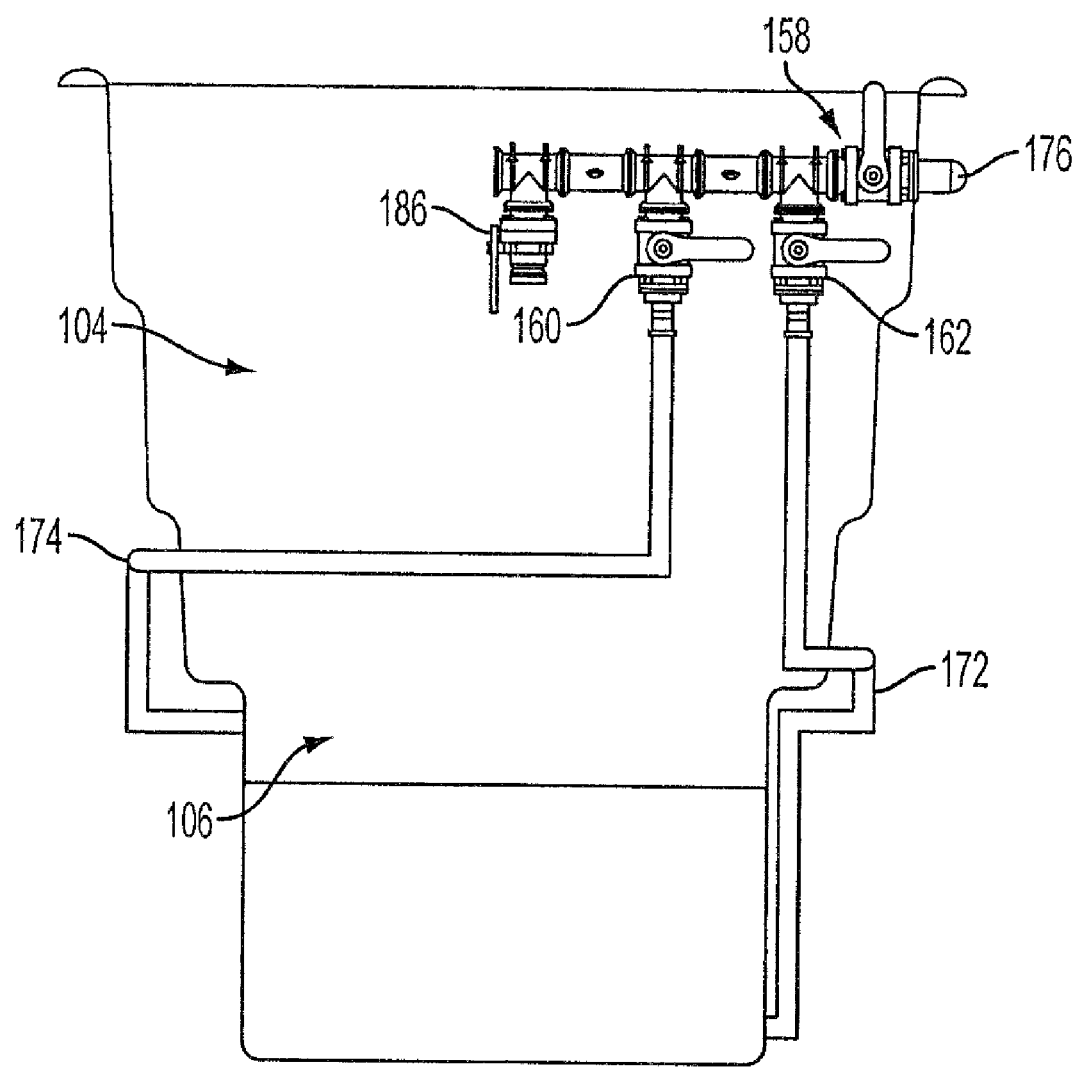
FIG. 8 illustrates an end view of a hopper of an automated solution maker in accordance with one embodiment of the present invention.
Figure 12:
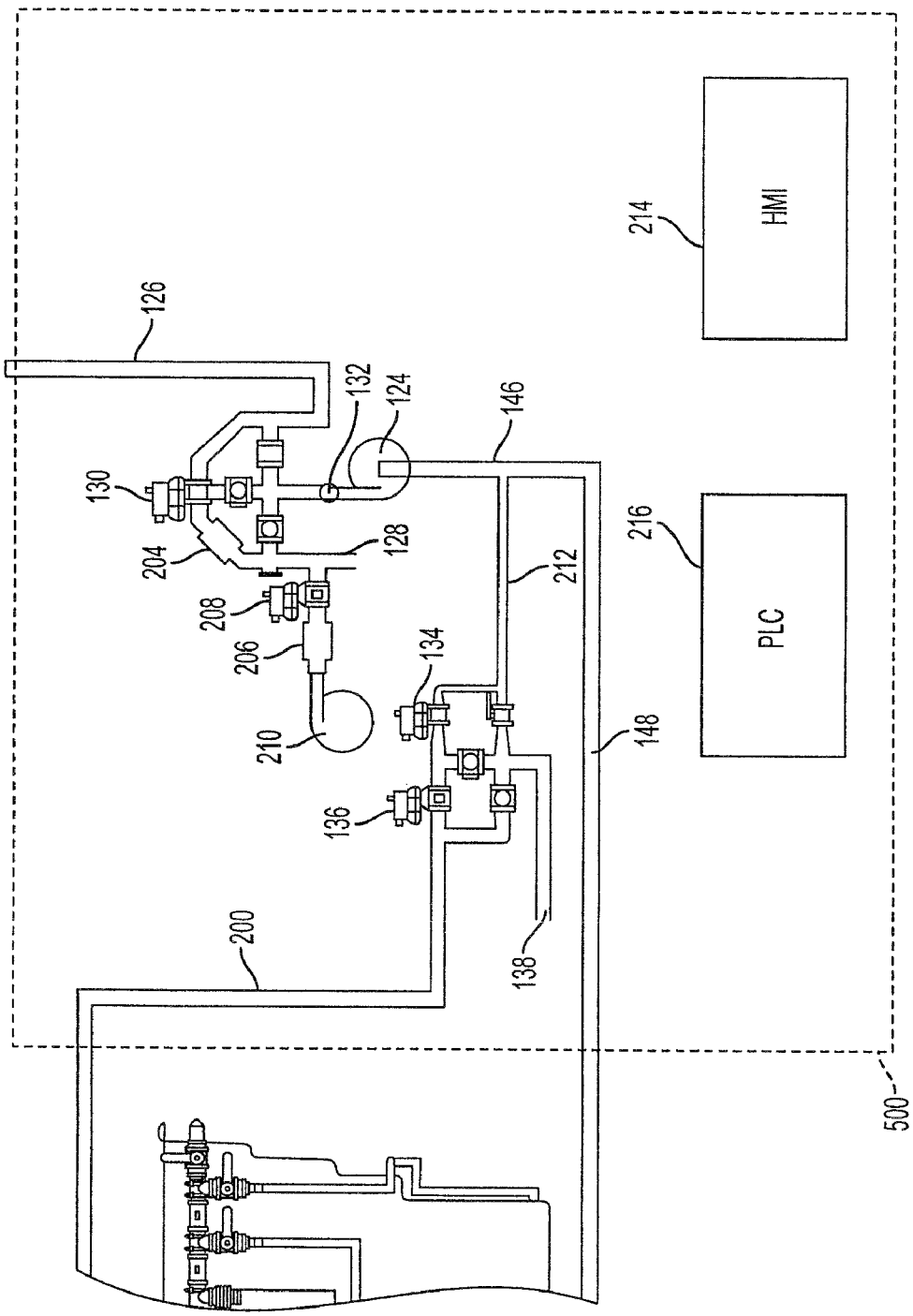
FIG. 12 illustrates a control panel and mechanical components of an automated solution maker in accordance with one embodiment of the present invention.
Figure 19:
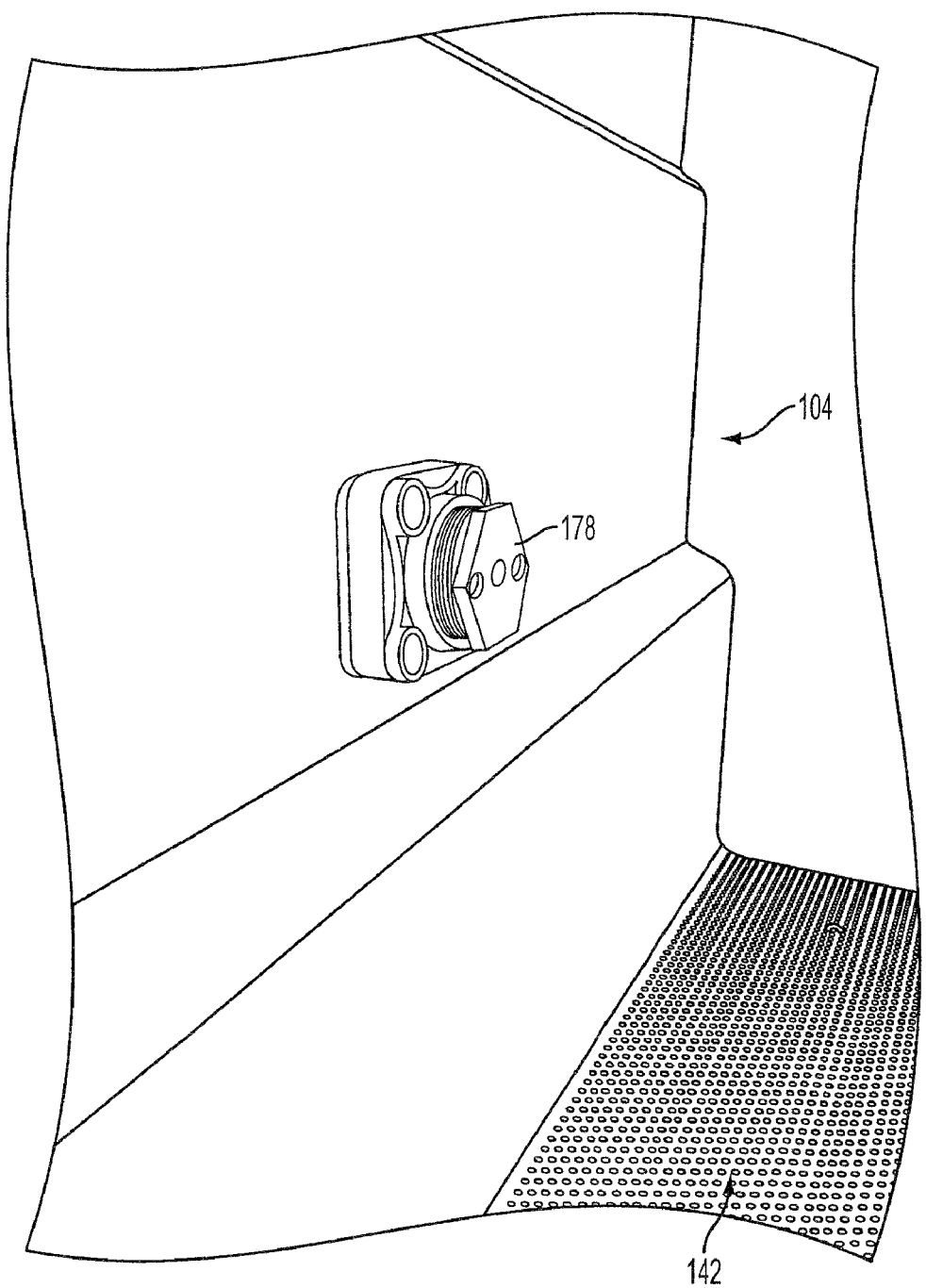
FIG. 19 illustrates an inside view of a first portion of an automated solution maker in accordance with one embodiment of the present invention.

The first portion 104 is further adapted to receive a solvent for mixture with the chemical to produce the desired solution. The automated brine maker is downward flowing and the solvent passes through the chemical bed in the first portion 104 due to the force of gravity. The solvent may be delivered to the first portion 104 in any suitable manner. A solvent line leading to the hopper may be provided. A self-regulating heating element may be coupled to the solvent line to protect against freezing of the solvent. In the embodiment of FIG. 1, the solvent is delivered via a solvent valve 136 that actuates flow from a solvent inlet 138. The solvent valve 136 may be provided as an electric actuated valve and valve actuation may be controlled by a programmable logic controller (PLC) 216 (see FIG. 12). Actuation may depend on one or more liquid level sensors. As discussed more fully below and shown in FIG. 3, a first liquid level sensor 118, a second liquid level sensor 120, and a third liquid level sensor 122 may be provided. As shown in FIGS. 8, 12, and 19, in a specific embodiment, the solvent inlet 138 may be pressurized and may supply solvent to the automated solution maker 100 via a solvent valve 136, conduit 200, manual valve 186, manual valve 158, conduit 176 and spray head 178 to automated dilute valve 134. The fresh solvent valve 136 may further comprise a manual override. Of course, while a specific embodiment is herein described, an automated solution maker within the scope of the present invention may include fewer or more component parts as would be understood by one skilled in the art.

Figure 5:
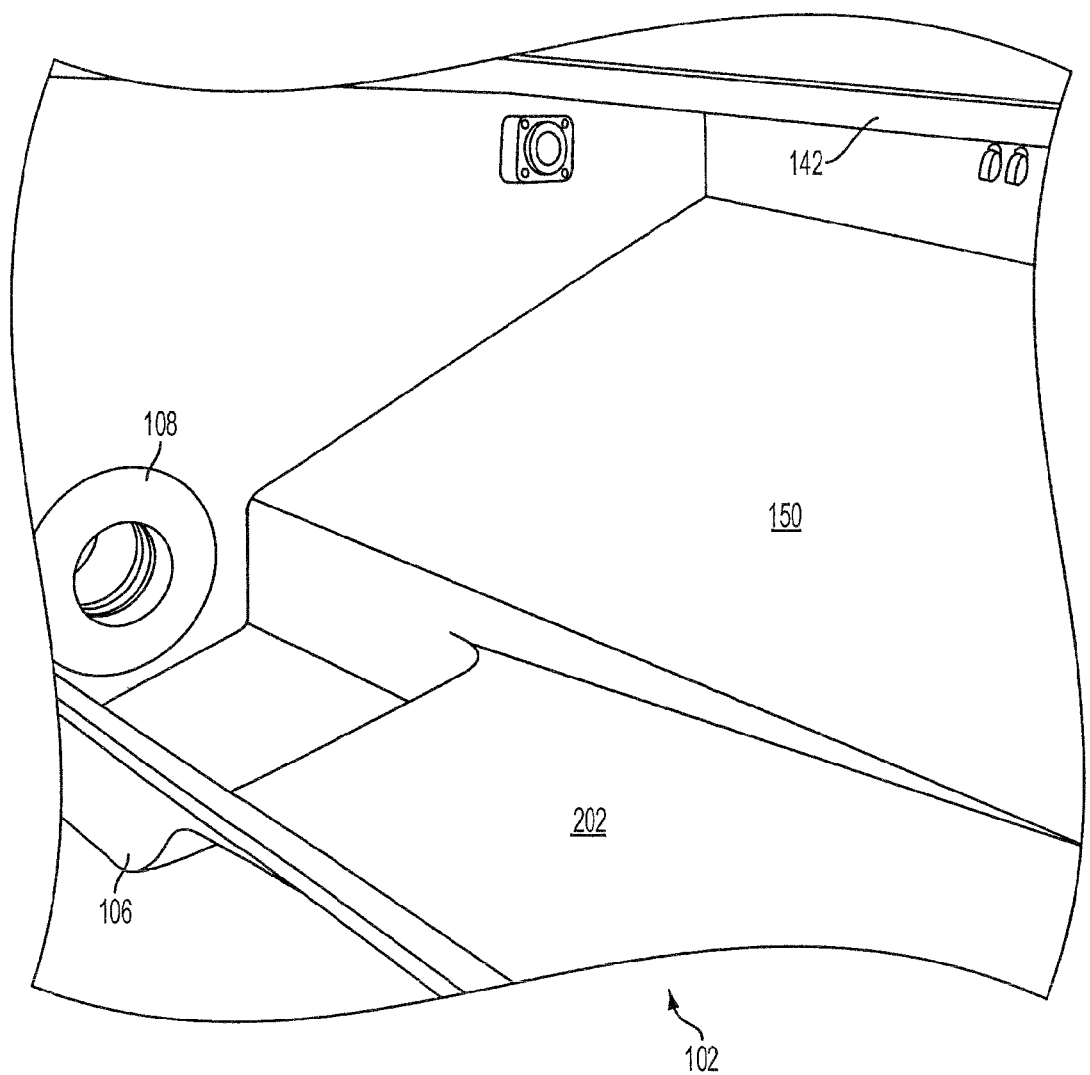
FIG. 5 illustrates an inside cutaway view of hopper of an automated solution maker in accordance with one embodiment of the present invention.

A grate 142 substantially prevents the chemical from passing from the first portion 104 of the hopper 102 to the second portion 106 of the hopper 102 before the chemical is dissolved in the solvent. Perforations may be provided in the grate 142. When a solution comprising the solvent and dissolved chemical is formed in the first portion 104, the perforations in the grate 142 allow the solution to pass through the grate 142 into the second portion 106 of the hopper 102. FIG. 5 illustrates one embodiment of a grate 142 suitable for use with the automated solution maker. As shown, the grate 142 may comprise a plurality of annular perforations 143. The perforations 143 may be approximately 3/16 inch diameter. Desirably, the perforations 143 are large enough to permit even flow of the solution through the grate 142 but small enough to prevent the chemical from passing through the grate 142. Thus, the grate 142 operates to support the chemical, collect debris, and allow passage of solution. In one embodiment, the grate 142 is nonmetallic and comprises 1½ inch fiberglass structural cross members.

Figure 20:
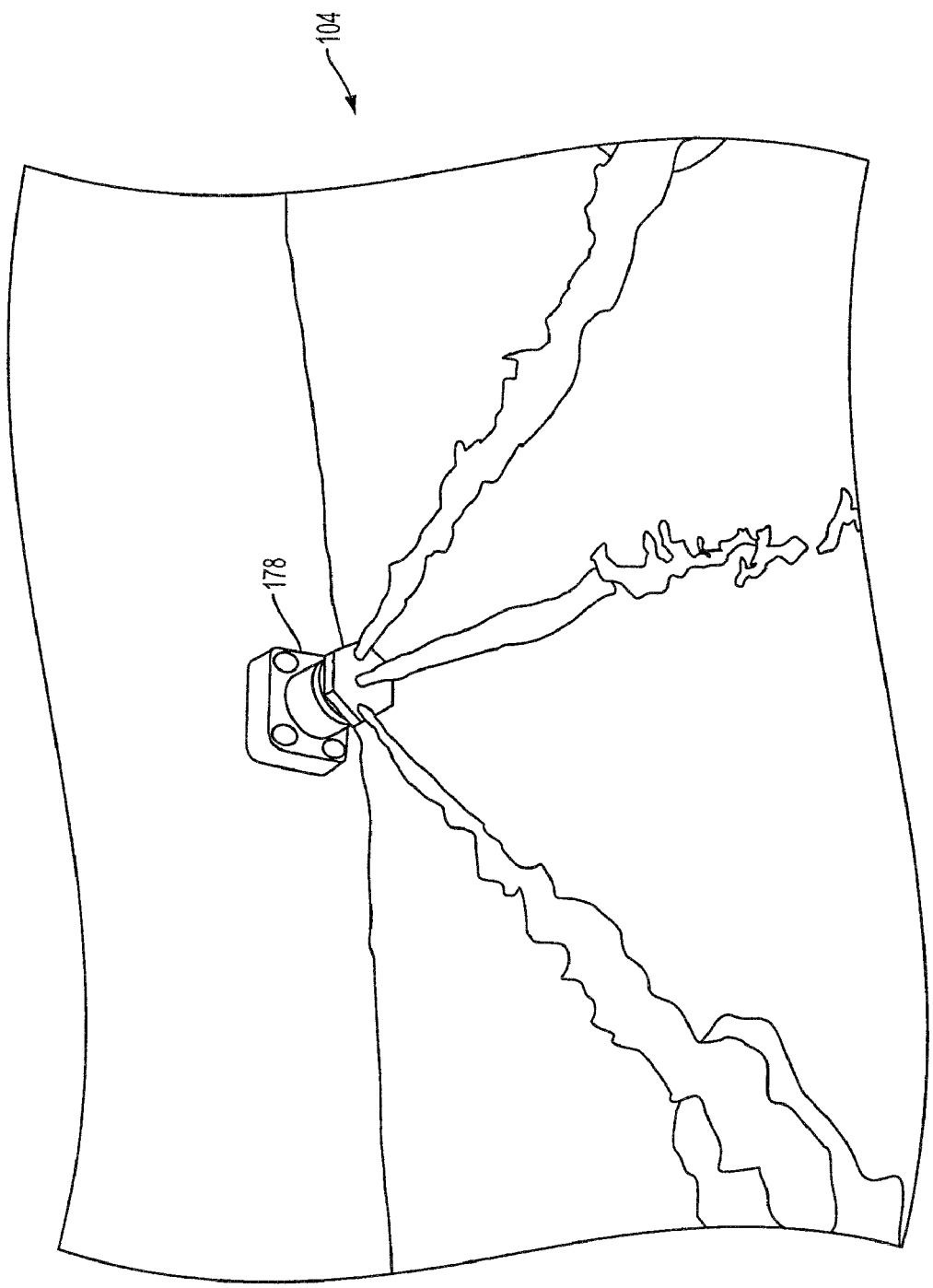
FIG. 20 illustrates an inside view of a first portion of an automated solution maker in accordance with one embodiment of the present invention.

FIGS. 19 and 20 show the inside of a first portion 104 of an automated solution maker. In FIG. 19, spray heads 178 for expelling solvent and grate 142 may be seen. FIG. 20 shows flow through the spray heads 178.

As stated above, one or more liquid level sensors may be provided. The liquid level sensors are liquid level sensing devices. They may be provided with switches that send a signal to the PLC 216. As such, the liquid level sensors may be operably connected to inputs of the PLC 216. The liquid level sensors may be provided as any suitable device. In one embodiment, a suitable liquid level sensor is a mechanical switch with a float device that activates a micro switch. In another embodiment, an inductive capacitive proximity switch may be used. The liquid level sensors maintain liquid levels in the hopper, and more specifically in the first portion of the hopper, at a desired level. Generally, high water levels may overfill the hopper and create a spill while low water levels may cause a transfer pump 124 to run dry and thereby damage the pump seals.

Figure 7:
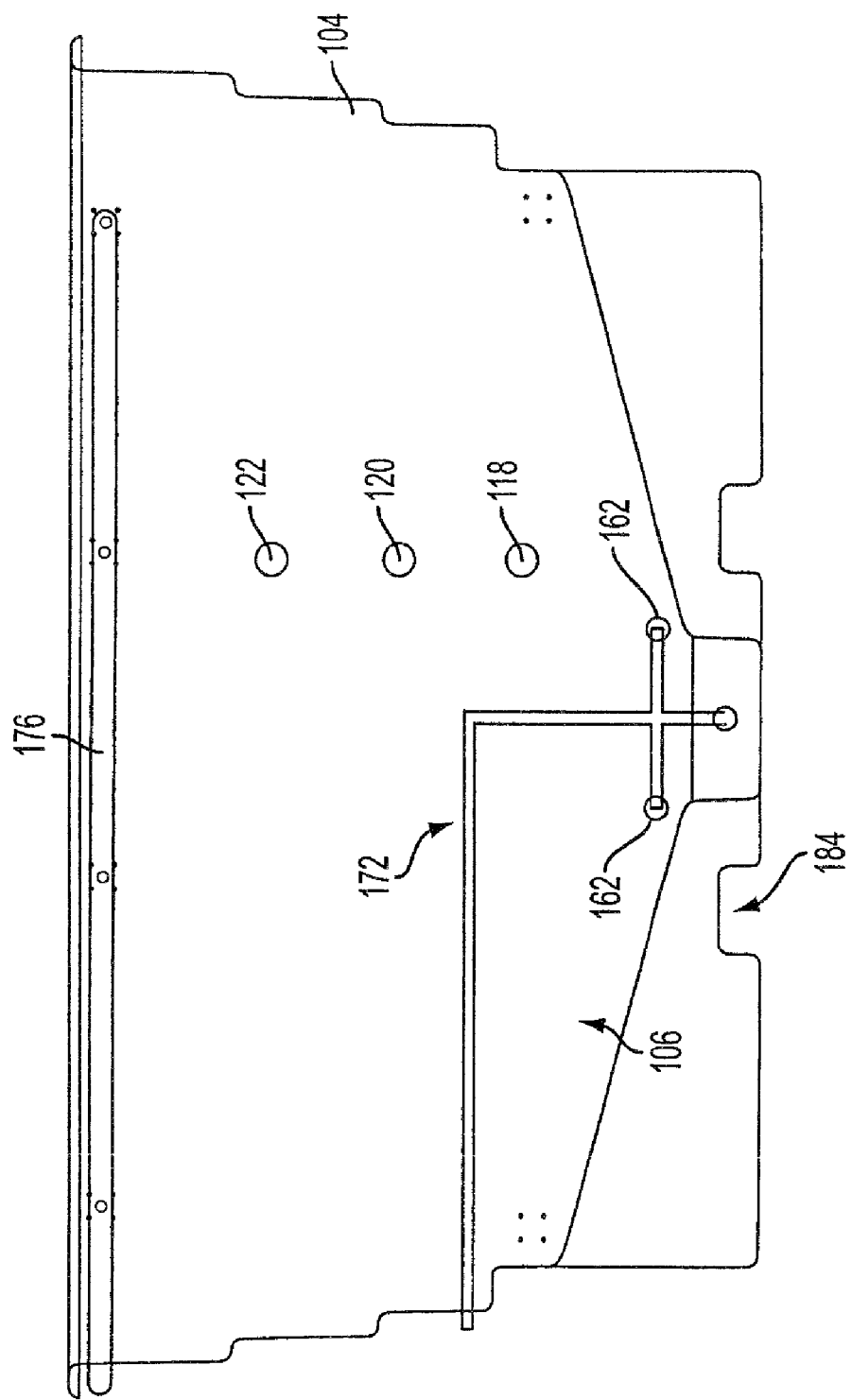
FIG. 7 illustrates a rear view of a hopper of an automated solution maker in accordance with one embodiment of the present invention.
Figure 9:
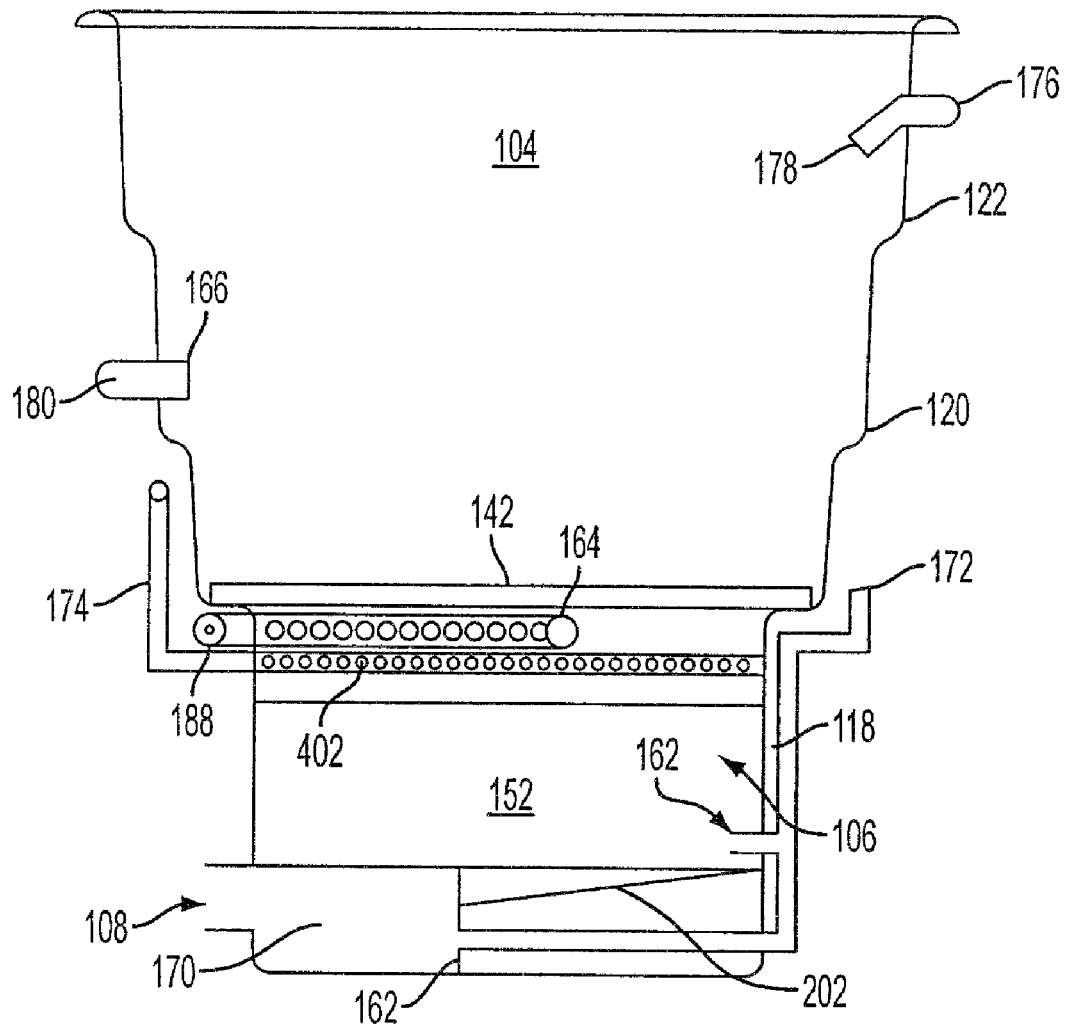
FIG. 9 illustrates a cutaway end view of a hopper of an automated solution maker in accordance with one embodiment of the present invention.
Figure 10:
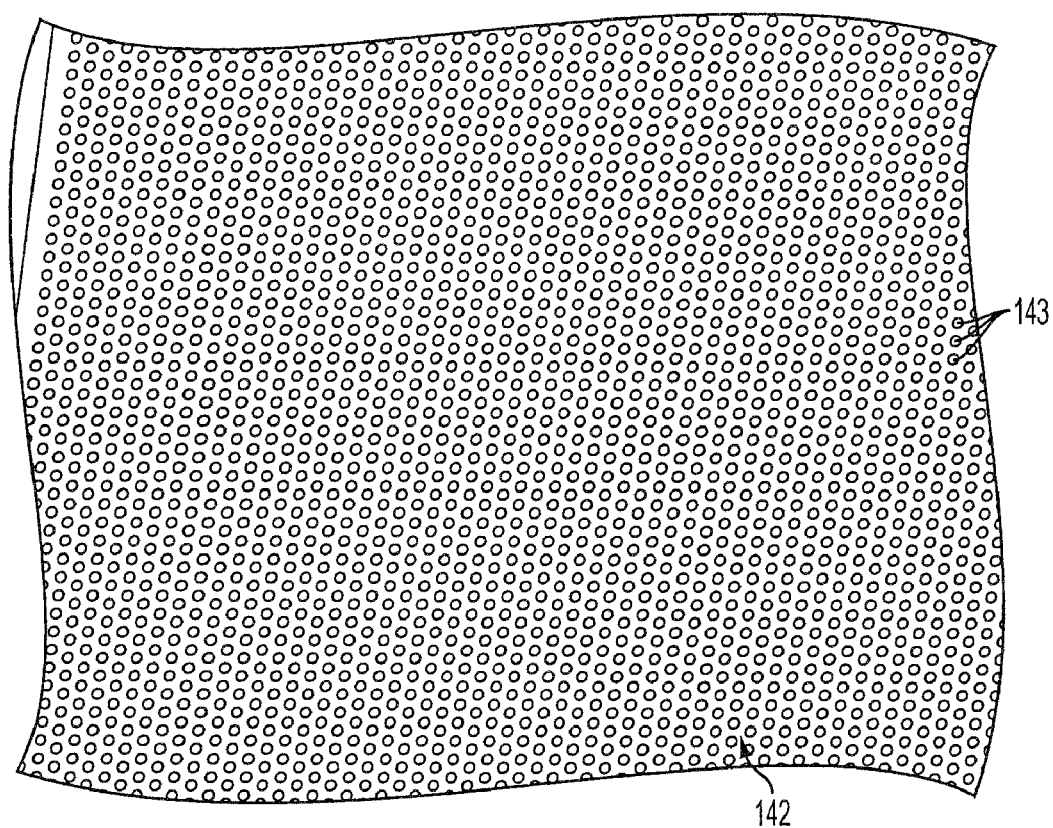
FIG. 10 illustrates a grate of an automated solution maker in accordance with one embodiment of the present invention.

As shown in FIG. 3, first, second, and third liquid level sensors 118, 120, and 122, respectively, are provided. Reference is made to FIGS. 7 and 9 to further illustrate the liquid level sensors. In some embodiments, more than three liquid level sensors may be provided. Alternately, no liquid level sensors may be provided. The first liquid level sensor 118 abuts the hopper 102 and is generally adjacent to the second liquid level sensor 120 and may be connected to an input of the PLC 216. The first liquid level sensor 118 detects if the water level in hopper 102 is low. If the liquid level is low and the automated solution maker 100 is in run mode, a pump 124 is turned to an "off" state if the automated brine maker 100 is in run mode. This protects pump 124 from damage caused by running dry.

The second liquid level sensor 120 is generally adjacent to the first liquid level sensor 118 and the third liquid level sensor 122 and may be connected to an input of the PLC 216. The second liquid level sensor 120 detects if an adequate amount of water is present in the hopper 102. Based on the detection of an adequate amount of solvent, the pump 124 is activated and switched to an "on" state. The pump 124 is latched into the "on" state until the batch is completed or the first liquid level sensor 118 detects that the liquid level is low.

The third liquid level sensor 122 abuts the hopper 102 and is generally adjacent to the second liquid level sensor 120 and may be connected to an input of the PLC 216. The third liquid level sensor 122 detects if the hopper 102 is holding a predetermined level of liquid. If this level of liquid is sensed, the solvent valve 136 is switched into the "off" position, thus protecting the hopper 102 from overflowing.

The second portion 106 of the hopper 102 comprises a brine solution suction tube 164 connected to a conduit 148 and a brine outlet valve 154. The brine outlet valve 154 is connected to the transfer pump 124 via an outlet conduit 148. A solvent dilute inlet 146 and a pump suction inlet may be connected to the conduit 148. As shown, the pump 124 may be provided in communication with a solution sensor 132. In one embodiment, the solution sensor 132 is a conductivity and temperature sensor of the terodial type. Such a sensor is solid state with no contact points and measures the inductive field of the solution. In one embodiment, the solution sensor 132 senses the conductivity and the temperature of the solution. In another embodiment, the solution sensor 132 senses only the conductivity of the solution. The solution sensor 132 may comprise a probe and conductivity analyzer. The solution sensor 132 measures the electrical resistance of the solution flowing across the solution sensor 132. The solution sensor 132 may be configured to measure continuously, thus providing constant input rather than periodic snapshots to the PLC 216, thereby increasing the efficiency of the machine.

Alternatively, a refractometer can be used in place of the solution sensor 132. The refractive properties of the solution vary base on concentration. The refractometer detects the refractive index of the solution, and the PLC 216 then is able to calculate, and adjust, the concentration as appropriate.

In one embodiment, the electrical resistance is compared to the temperature of the solution and these two variables are equated to form a temperature compensated conductivity reading. This reading is equated to a concentration curve which in turn expresses the reading of the solution as a temperature compensated concentration by weight. A concentration curve correlating temperature compensated conductivity to concentration may be developed for any chemicals in solution. Thus, for example, in an automated brine maker, a sodium chloride concentration curve is used. As stated above, in one embodiment, the solution sensor measures the temperature and the conductivity of the solution. The properties of brine change with temperature and, thus, it may be desirable to measure the temperature to formulate the actual concentration. As will be discussed more fully below, solution that is outside of a tolerance of a target concentration may be adjusted while solution that is within a tolerance of a target concentration may be processed to a storage tank. By measuring and adjusting the concentration midstream, the automated solution maker produces solution continuously at a target concentration without the intervention of an operator.

Figure 13:
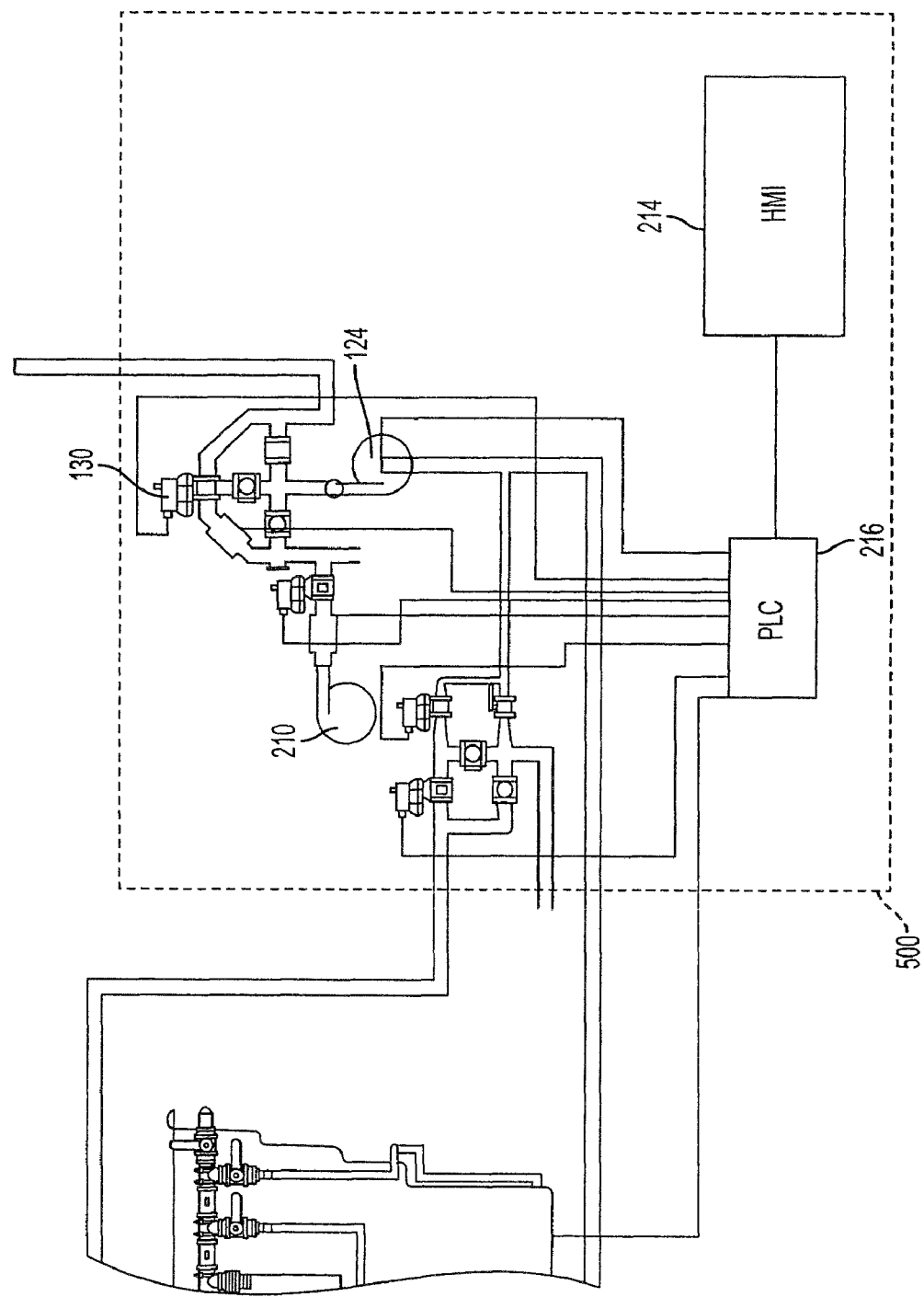
FIG. 13 illustrates a control manifold with programmable logic controller and human-machine interface of an automated solution maker in accordance with one embodiment of the present invention.

With reference to FIGS. 1, 12, and 13, the solution sensor 132 may be in operable communication with the PLC 216. In response to the determined concentration, the PLC 216 may activate a dilute valve 134 or a diverter valve 130 to ensure that only solution of a desired concentration is diverted to a storage tank. The target concentration of the solution may be any desired concentration. For brine solutions, a suitable target concentration may be in the range of 19.6 to 27% by weight. For example, the target concentration may be 23.3% by weight. In addition to establishing a desired solution concentration, a desired solution concentration tolerance may be established wherein a certain variance from the desired solution concentration is considered acceptable. An acceptable tolerance may be +/−0.3% of the target concentration.

The diverter valve 130 diverts flow from the pump 124 through a return tube 126 if the solution concentration is above or below the target concentration or through a finished product tube 128 if the solution concentration is within the approximately the desired solution concentration. The diverter valve 130 is controlled by the PLC 216 and depends on the target versus actual concentration. Solution that is outside of a tolerance of the target concentration may be diverted to conduit 126, valve 156, conduit 180, and agitation nozzles 166 for a further pass through the hopper 104. Again, while specific embodiment of a diverting mechanism is provided, alternate mechanisms as would be known to one skilled in the art may be used for diverting solution outside of a tolerance of a target concentration to the hopper.

The return tube 126 passes flow to a valve 156, a conduit 180 and agitation nozzles 166 in the first portion 104 of the hopper 102. The solution passes through the return tube 126 and returns to the hopper 102. The finished product tube 128 passes to a storage tank 410 (see FIG. 14). The diverter valve 136 may further comprise a manual override.

The dilute valve 134 is controlled by the PLC 216. The dilute valve 134 may communicate with the solution pump 124. The dilute valve 134 thus actuates open to pass sufficient solvent to dilute the solution when pump 124 is passing flow and the solution sensor 132 senses a solution actual concentration over the target concentration. The dilute valve 134 communicates with the solvent inlet 138. The dilute valve 134 actuates open when the pump 124 is passing flow and the solution sensor 132 senses a solution actual concentration over a target concentration. When dilute valve 134 is open, solvent from the solvent inlet 138 passes through the dilute valve 134 into the conduit 212 and into the dilute inlet 146. The solvent combines with the solution passing from the second portion 106 of the hopper 102 to the pump 124. The dilute valve 134 allows sufficient solution to dilute the over-concentrated solution reaches the target concentration and thus does not over-dilute the solution. The dilute valve 134 may further comprise a manual override.

The sensed solution may be automatically diluted in any suitable manner at any suitable point. For instance, the sensed solution may be diluted via addition of solvent to the outlet tube. Alternately, the sensed solution may be diluted via return to the hopper and mixing with further solvent in the hopper.

A flow measuring device 204, shown in FIG. 12, may be provided for measuring the volume of finished solution being transferred to the storage tank. The flow measuring device 204 may be provided in communication with the PLC 216. Further, an additive pump 210, flow measuring device 206, and actuated valve 208 may be provided to allow flow into a conduit 128. The additive pump 210, flow measuring device 206, and actuated valve 208 may be in communication with the PLC 216 to enable mixing of an additive with the solution as it is transferred to a storage tank, as is discussed more fully below.

During use, solids such as dirt and silica may infiltrate the automated solution maker. These solids typically cause sediment build up in solution making machines. Generally, it is desirable for the solution to be as clean as possible. Foreign material in the solution is abrasive. The abrasiveness can produce excess wear on pumps, flow meters and valves associated with the production and application of the brine solution. Sediment deposits caused by foreign material in suspension of the solution over time settle out and form layers of sediment in the storage tank. Cleaning the sediment can be time consuming and can require the machine to be offline.

In one embodiment, the second portion 106 of the hopper 102 is configured for easy cleaning. The second portion 106 (see, for example, FIGS. 3 and 21) thus comprises at least one sloped plane along which sediment slides to a sump located at the bottom of the sloped plane. A suitable slope for the at least one sloped plane is approximately 15 degrees. In the embodiment shown, the second portion 106 comprises a first sloped plane 150, a second sloped plane 152, and a third sloped plain 202. Sediment that passes through the grate 142 collects on the bottom of the second portion 106 of the hopper in a sump area formed by the first sloped plane 150, second sloped plane 152, and the third sloped plane 202. The sump area may be, for example, approximately 12 inches by 12 inches.

A sump outlet 108 may be provided to allow the sediment to be flushed out of the hopper 102. Such flushing may be done via spray bars 402 (shown, for example, in FIGS. 2 and 9) and a nozzle 162 (shown, for example, in FIG. 3). A plurality of nozzles, for example a nozzle provided on each wall to the left, right, and back side of the sump, may be provided for forcing sediment through the sump and out of the automated solution maker. The automated solution maker may be configured for automatic flushing of the sediment or for manual flushing of the sediment. Further, the sediment may be flushed from the hopper 102 while the chemical is in the first portion 104 of the hopper 102 or may be flushed from the hopper 102 when there is substantially no chemical present in the first portion 104 of the hopper 102. The grate 142 in the hopper 102 supports the weight of the chemical, thus enabling the sediment to be flushed while the chemical is in the hopper 102.

Thus, the automated solution maker further provides a method for separating foreign material such as undissolved silica, dirt, and gravel from the hopper 102. The foreign material may accumulate in a sump area from which the deposits may be flushed at a later time. Further, the automated solution maker enables a flushing of deposits of foreign material from the hopper while a chemical remains in the first portion of the hopper.

The automated solution maker, in some embodiments, may hold 10,000-20,000 pounds of a chemical such as salt. Thus, the hopper 102 is manufactured to be sufficiently strong to support the load. The hopper 102 may be made of any suitable material. In one embodiment a suitable material from which the hopper 102 may be constructed is fiberglass. Fiberglass is strong and is not affected by salt solutions. More specifically, the hopper may be constructed of 16,000 lb tensile strength fiberglass and isophthalic resin. Other suitable materials for the hopper 102 include but are not limited to stainless steel and polypropylene. The inside surfaces of the hopper may be coated with a ceramic resin. Such coating may be, for example, approximately 0.050 inches thick. Structural integral ribs may be provided within the hopper to limit flex to within one inch from fill to empty. In one embodiment, the overall thickness of fiberglass and resin in the hopper is approximately 0.35 inches. Structural areas such as ribs, corners, and floor may be provided with additional layers of woven fiberglass mat for an overall thickness of approximately 0.50 inches.

In use, the automated solution maker may be used by a highway department for producing brine solution to deice roads. The automated solution maker may be used outdoors in cold weather. Thus, the automated solution maker may be provided with one or more of its components being heated. Heating elements 168 (see, for example, FIG. 3) may be provided in the hopper 102. A temperature sensing device may be provided in the hopper 102 in communication with the PLC 216. The temperature sensing device indicates if the heating elements 168 need to be activated to raise the temperature of the hopper 102. These elements may be thermostatically activated on and off and capable of sustaining a temperature of 32 degrees Fahrenheit or higher to prevent the vessel from freezing.

Thus, the hopper 102 may be heated to minimize the chance of the hopper freezing in cold weather. In one embodiment, silicone mat heaters are built into the hopper. For example, two nine-foot square silicone mats may built into the hopper. A roll tarp such as a permanently mounted roll tarp may be used in conjunction with the heaters for heating the hopper. Such roll tarp may be provided with arches and a roll mechanism and is useful for keeping heat in and debris out. If provided, the roll tarp may be mounted over an open top of the hopper.

Figure 11:
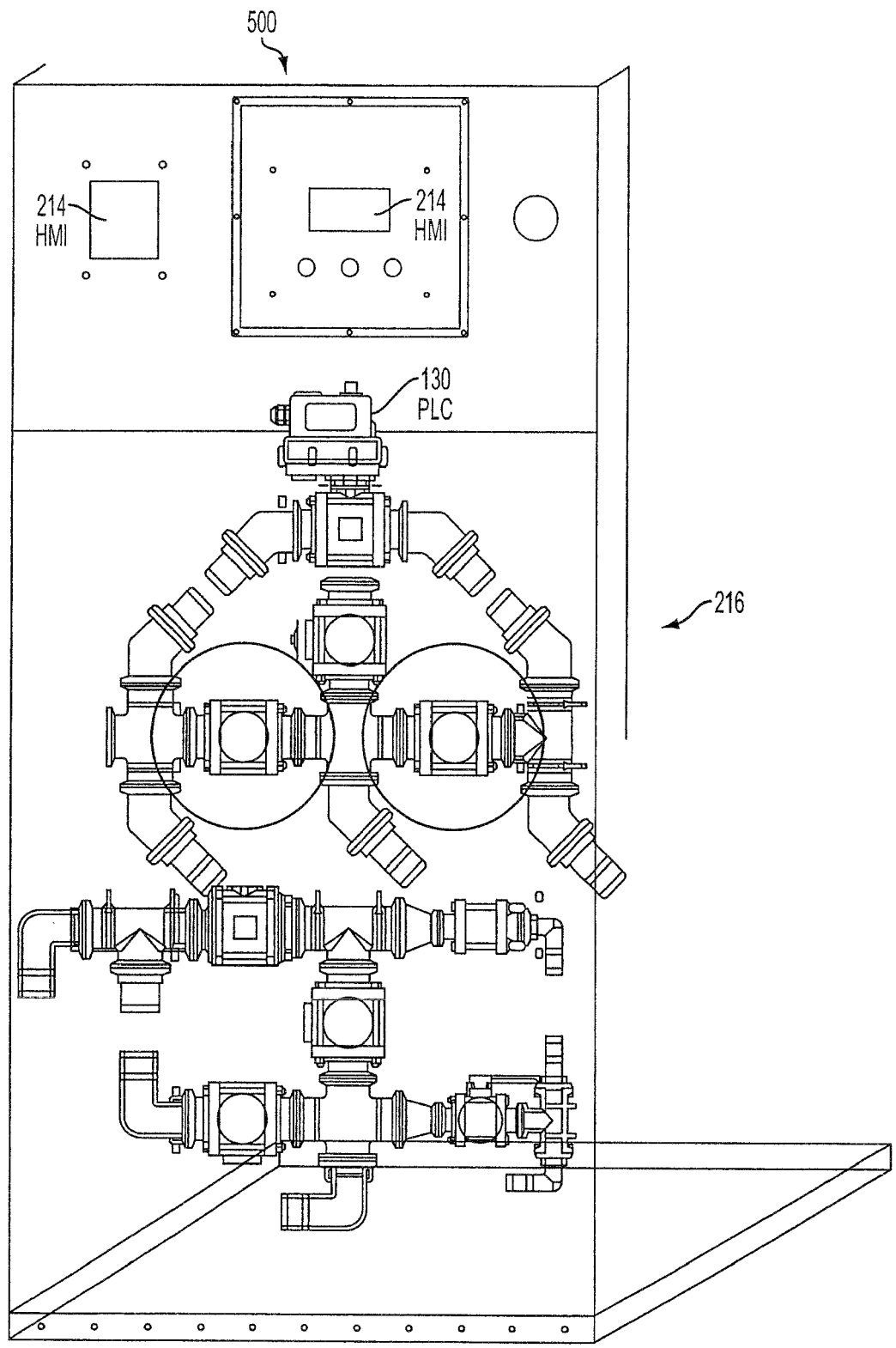
FIG. 11 illustrates a control panel of an automated solution maker in accordance with one embodiment of the present invention.

FIGS. 11-13 illustrates embodiments of a control panel of the automated solution maker. The control panel 500 may be comprised of mechanical flow control devices, the conductivity sensor 132, the PLC 216, and the human-machine interface (HMI) 214. In another embodiment, the PLC 216 is in communication with HMI 214 to create a data log. Solution produced and diverted to the storage tank is measured via a flow measuring device 204 (see, for example, FIG. 12) and recorded in the PLC program 216. This measurement may be via a flow meter of a flow switch. Calculations may be introduced into the PLC program 216 to formulate the amount of solution produced, the chemical usage, and the solvent usage in the production process. The data log thus creates reports that may be viewed on the HMI 214 or printed onto a printer. These reports may be created daily and may show a running season total of solution produced as well as chemical and solvent usage (and additive usage if an additive is introduced into the solution). Multiple user reports may be generated. For example, a daily and season total may be created and tailored for separate individuals for accounting and billing purposes.

The control panel enables regulation of solvent flow into the first portion of the hopper. The solvent concentration and/or actual temperature compensated concentration may be monitored and, if the concentration is out of the tolerance for the target concentration, the solution may be returned to the hopper. Alternately, the solution may be diluted mid-stream after exiting the hopper to meet the desired concentration level. Solution of a desired concentration may be processed to a holding tank. As shown, the PLC, conductivity analyzer, and other electric controls may be mounted in an electric enclosure on the rear side of the panel. The main panel of the control panel may include valve labels and valve functions. Information displayed on the screen may include the actual production solution concentration in the form of % concentration by weight, the gallons of solvent used to make solution, self-diagnostic of the conductivity sensor, self-diagnostic of electric valves (indicating if and what valve is not functioning normally), valve status of open or closed, and status of the machine along with the status of electrical components. In one embodiment, the display is multi-colored with a green screen indicating system normal, a red screen indicating machine fault, and an orange screen indicating setup parameters.

The automated solution maker may be configured as self-diagnostic. Accordingly, the valves and sensors may be in operable communication with the controller to confirm the current state. In the event of a component failure, the system may be configured to automatically shut down and provide information on the specific failure along with a corrective measure, including how to manually override problem and part number failure.

Figure 14:
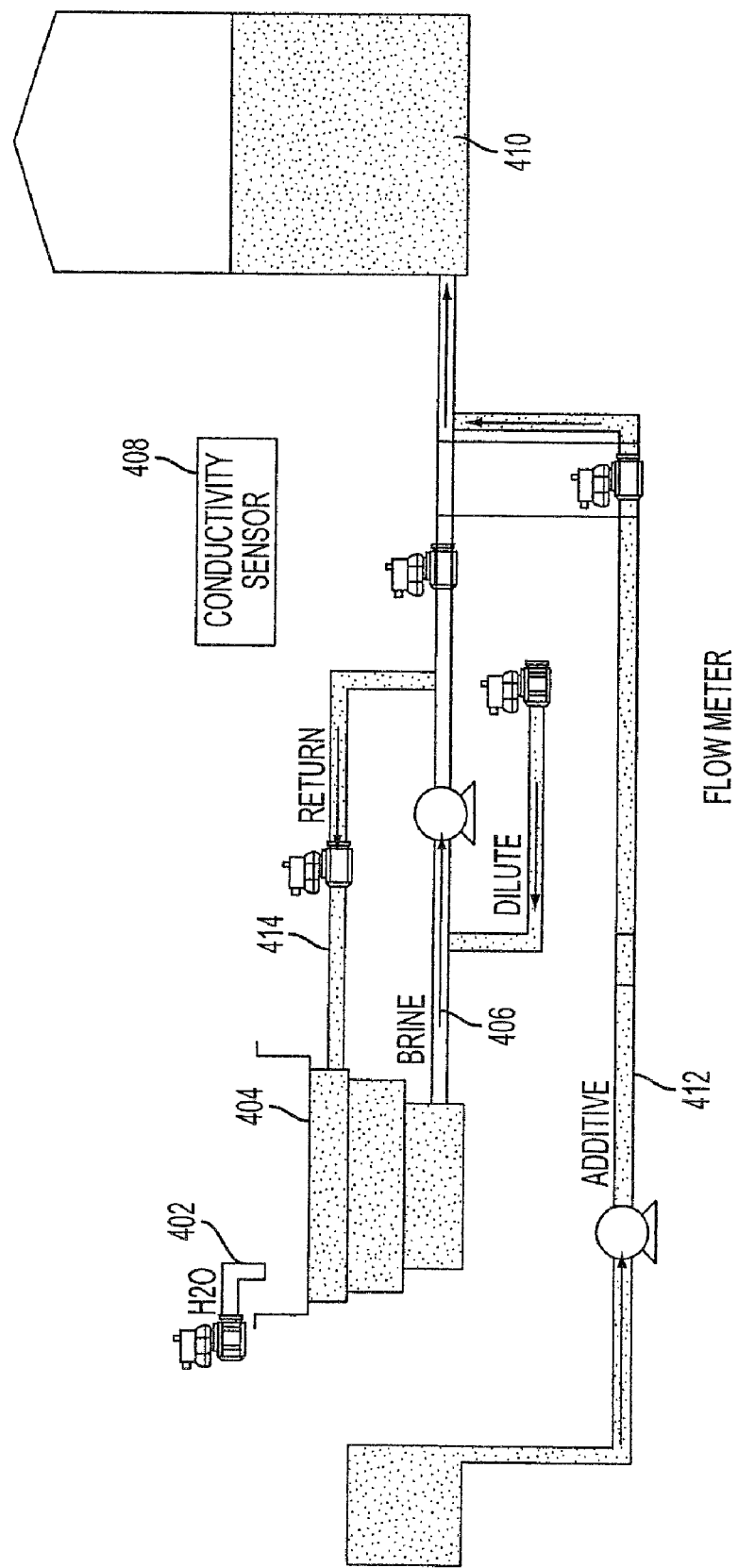
FIG. 14 illustrates flow of an automated solution maker in accordance with one embodiment of the present invention.
Figure 15:
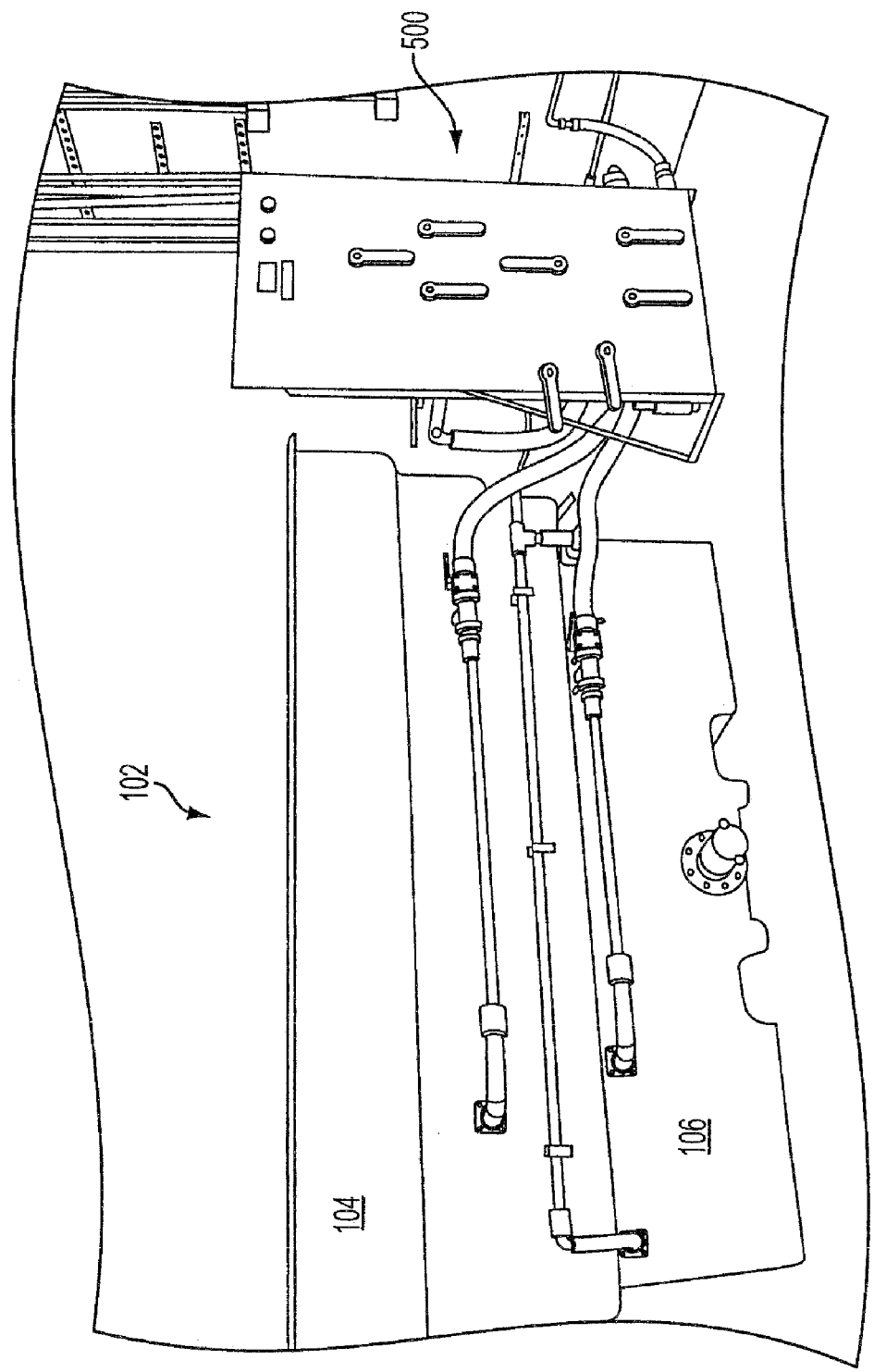
FIG. 15 illustrates a perspective view of an automated solution maker and control panel in accordance with one embodiment of the present invention.

FIG. 14 illustrates flow of an automated solution maker in accordance with one embodiment of the present invention. As shown, solvent 402, such as water, passes into the hopper 404. In the hopper 404, the solvent mixes with a chemical, such as salt, to form a solution, such as brine. The solution 406 exits the hopper 404. A conductivity sensor 408 measures the conductivity of the exiting solution 406 and thereby determines the concentration of the solution 406. If the concentration is within the desired range, the solution 406 continues to a storage tank 410. If desired, an additive 412 may be added to the solution 406 after it is determined to be at an acceptable concentration. If the solution 406 is not at the desired concentration, it is returned 414 to the hopper 404. This process is described more precisely below.

In operation, a chemical, for example rock salt, is deposited in the first portion 104 of hopper 102. The pump 124 is initially in the "off" state while the solvent valve 136 is in the "on" position. An operator at the HMI 214 enters a desired target solution concentration, volume of solution to be produced, and, if desired, a ratio of additive in the finished product. Upon entering this information, the operator activates a start switch which activates the PLC program into the operation mode. The operation mode begins solvent flow from valve 136 into the hopper 104. The first portion 104 of the hopper 102 receives solvent from spray heads 178 via the solvent inlet 138, the actuated valve 136, the conduit 200, the valve 186, the valve 158, and the conduit 176. The solvent dissolves the chemical, and the formed solution passes through the grate 142 into the second portion 106 of the hopper 102. Solvent continues to enter through the spray heads 178 into the hopper 102 until the third liquid level sensor 122 detects the hopper 102 is full of liquid and activates the solvent valve 136 into the "off" position so that the hopper 102 does not overflow.

While the hopper 102 receives solvent, the second liquid level sensor 120 detects whether an adequate amount of solvent is present in the hopper 102. When an adequate amount of solvent is present in the hopper 102, the pump 124 is actuated into an "on" position. The pump 124 is latched into the "on" position until the batch is completed or the first liquid level sensor 118 detects that the liquid level is low.

The pump 124 transfers the solution from the second portion 106 of hopper 102 through the first suction tube 164, the conduit 188, the valve 154, conduit, dilute inlet 146 and into the suction side inlet of the pump 124. The pump 124 may be configured to pump approximately 5,000 gallons of solution per hour with a dynamic head of 45 feet.

The solution sensor 132 senses the conductivity and the temperature of the solution transferred by the pump 124 from the hopper 106. The solution sensor 132 measures the electrical resistance of the solution flowing across the solution sensor 132. This measurement may be done by a probe and conductivity analyzer of the solution sensor 132. The electrical resistance is compared to the temperature of the solution and these two variables are equated to form a temperature compensated conductivity reading. This reading is equated to a chemical concentration curve which in turn expresses the reading of the solution as a temperature compensated concentration by weight. A concentration curve correlating temperature compensated conductivity to concentration may be developed for any chemicals in solution. Thus, for example, in an automated brine maker, a sodium chloride concentration curve is used.

If the solution is over-concentrated the conductivity analyzer then communicates with the PLC 216; which in turn opens the dilute valve 134 to permit solvent to dilute the over-concentrated solution exiting the hopper 106 to the target concentration. When the dilute valve 134 is activated, solvent from the solvent inlet 138 passes through the dilute valve 134 and into the dilute inlet 146 and combines with the solution passing from the second portion 106 of the hopper 102 to the pump 124. The dilute valve 134 remains activated until the solution reaches the target concentration. The over-concentrated solution is diverted from the pump 124 by the diverter valve 130 and passes through the return tube 126 into the first portion 104 of the hopper 102 via the conduit 180, valve 156 and agitation nozzles 166.

If the solution is under-concentrated, the under-concentrated solution is diverted from the pump 124 by the diverter valve 130 and passes through the return tube 126 into the first portion 104 of the hopper 102 via valve 156, conduit 180, and agitation nozzles 166.

If the solution is within a tolerance level of a target concentration, the solution is diverted from the pump 124 by the diverter valve 130 and passes through the finished product tube 128 and into a storage tank (not shown). Optionally, if trucks are being loaded with solution during operation of the automated solution maker, solution within a tolerance level of a target concentration may be diverted directly to the a truck via a truck fill hose. When diverting solution to a storage tank, a remove till electric plug wiring harness may be provided to automatically shut off filling of the storage tank when full. Thus, a sensing device may be provided for sensing the state of the storage tank.

Over time the liquid level drops in the hopper 102 due to solution within the tolerance level of the target concentration being sent to the storage tank. First liquid level sensor 118 detects if the water level in hopper 102 is low and turns pump 124 to the "off" state if the automated solution maker 100 is in operate mode. Alternately, solvent and chemicals may be continuously provided to the automated solution maker. In a semi-continuous embodiment, the automated solution maker 100 continuously produces solution of a desired concentration. Thus, the automated solution maker 100 may be configured for continuous batch processing. Continuous batch processing enables production of more solution per amount of time the automated solution maker is running.

The configuration of the automated solution maker thus offers a downward flow design. In the first portion 104 of the hopper 102, solvent flows downwardly through the chemical to form the solution. The solution passes through the grate 142, into the second portion 106. The solution with the highest concentration settles to the bottom of the second portion 106 where the solution is removed for processing.

A data log may be generated by the automated solution maker for recording how much solution is produced and the quantity of ingredients (chemical and solvent) used.

FIGS. 3, 5, and 20 further illustrate the easy cleaning aspect of the automated solution maker.

Figure 21:
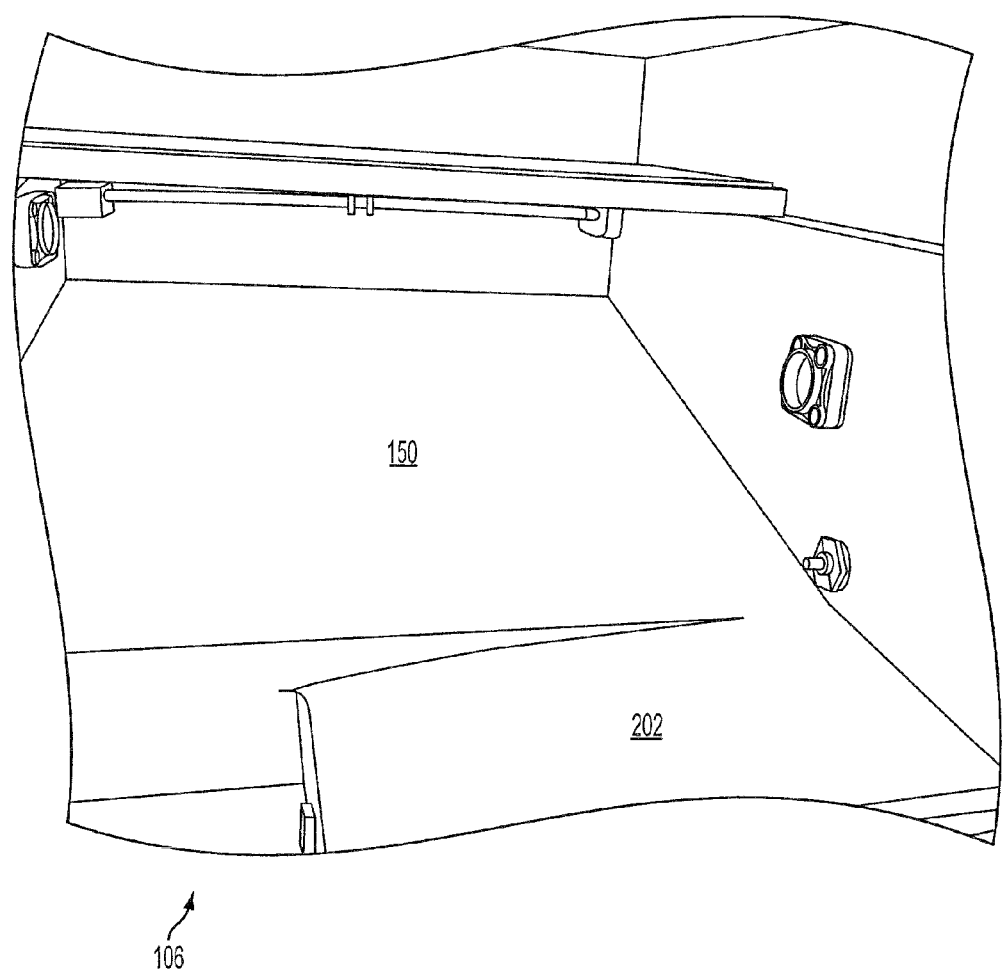
FIG. 21 illustrates an inside view of a second portion of an automated solution maker in accordance with one embodiment of the present invention.

FIGS. 3, 5, and 21 illustrate the sloping surfaces and sump of the second portion 106 of the hopper 102. Due to the sloping surfaces, sediment that passes through the grate 142 collects on the bottom of the second portion in an area adjacent a sump outlet 108. Any suitable number of sloping surfaces may be used. In the embodiment shown, a first sloped plane 150, a second sloped plane 152 and a third sloped plain 202 are provided. Thus, sediment that passes through the grate 142 collects on the bottom of the second portion 106 of the hopper in an area formed by the first sloped plane 150, the second sloped plane 152 and the third sloped plane 202. The sump outlet 108 allows the sediment to be flushed from the hopper 102 using the spray bars 402 and nozzles 162, as described above.

Figure 4:
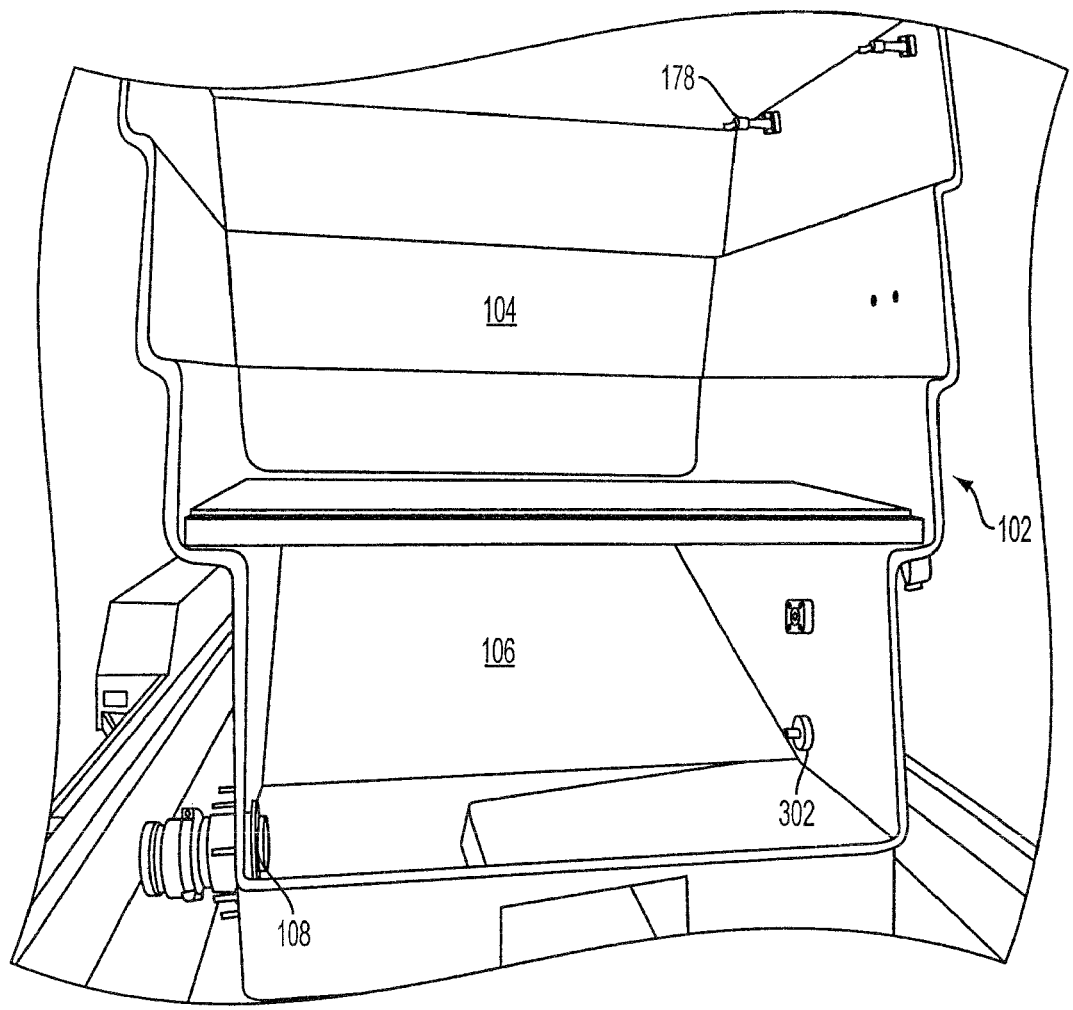
FIG. 4 illustrates a cutaway perspective view of a hopper of an automated solution maker in accordance with one embodiment of the present invention.

FIGS. 2-4 illustrate the hopper 102. The hopper comprises a first portion 104 and a second portion 106. Nozzles 162 are provided on the second portion 106. The nozzles 162 spray a liquid substantially in the direction of sump outlet 108, provided in the second portion 106. In one embodiment, the liquid that is sprayed by the nozzles 162 is water. Thus, liquid is expelled from the nozzles 162 and directed towards sediment accumulated adjacent the sump outlet 108. Force from the spray forces the sediment to pass through the sump outlet 108. Of course, any other suitable means for forcing the sediment through the sump outlet may be used.

As further illustrated by FIGS. 19 and 20, the first portion 104 of the hopper 102 may include a spray head 178. Alternately, the first portion 104 may include a plurality of spray heads. The spray head 178 receives solvent from the solvent inlet 138 via the solvent valve 136.

Figure 6:
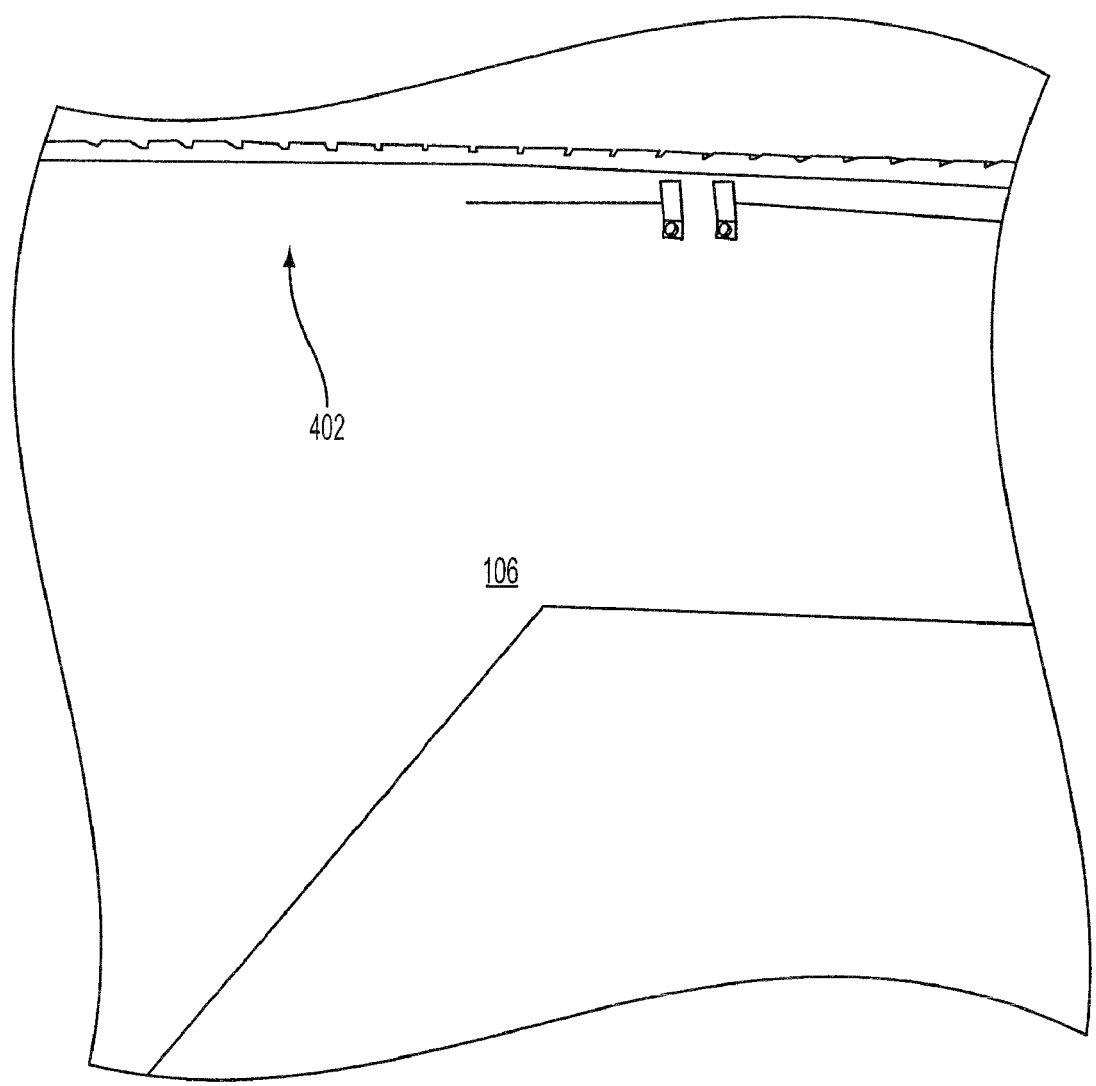
FIG. 6 illustrates an interior view of a hopper of an automated solution maker in accordance with one embodiment of the present invention.

FIGS. 6 and 9 illustrate a plurality of spray bars 402 (only one side shown) that are located on opposite sides of second portion 106 of the hopper 102. The spray bars 402 spray a liquid that forces sediment towards the sump outlet 108.

As discussed above, during use of the automated solution maker, sediment may pass through the grate 142 into the second portion 106 of the hopper 102. Sediment that settles on first sloped plane 150 and second sloped plane 152 is forced downward towards the bottom of second portion 106 via spray bars 402 that are positioned along the first sloped plane 150 and the second sloped plane 152. The spray bars 402 are supplied with liquid via liquid supply 138, conduit 200, water inlet 186, flush valve 160, and conduit 174. The sediment that is located in the bottom of second portion 106 is forced out of the sump outlet 108 of the second portion 106 via the nozzle 162. Liquid is supplied to the nozzle 162 via liquid supply 138, conduit 200, water inlet 162, and conduit 172.

The chemical is supported within the first portion 104 by the grate 142. Thus, the sediment may be flushed from the hopper 102 while chemical is in the first portion 104 of the hopper 102. Alternately, the sediment may be flushed from the hopper 102 when there is substantially no chemical in the first portion 104 of the hopper 102.

FIG. 12 illustrates a control panel for an automated solution maker wherein an additive may be supplied to the solution. Thus, the automated solution maker may be used to inject an additive into the desired solution concentration at a desired ratio. For example, when the automated solution maker is used to make brine, additives that make brine work at lower temperatures or reduce the corrosiveness of brine may be beneficial.

Typically brine is used at approximately 20 degrees Fahrenheit or above. By mixing additives with the brine, the effective temperature for using brine may be reduced to approximately 0 degrees Fahrenheit, thereby providing a solution of melting snow and ice at lower temperatures. Salt brine is naturally corrosive and the corrosive nature of the brine leads to corrosion of bridge decks, vehicles, and roadways. Reducing the corrosive nature of brine and lowering the freezing point of brine by mixing at least one additive at a predefined ratio into the brine has benefits to the environment. Generally, these additives are costly compared to the cost of brine solution. It is desirable to provide an automated apparatus for injecting a desired amount of additive into the solution when needed and thus reduce cost and enable an enriched product to be produced when needed.

Using the embodiment of FIG. 12, a user enters a desired percentage of total volume in which an additive is to be processed via the HMI 214 to the storage tank where the finished product is stored. As brine is produced and diverted to the storage tank, a predetermined ratio of additive is placed into the conduit 128 via the pump 210 controlled by the PLC 216 connected to a supply tank for the additive (not shown). The pump 210 transports the solution. A flow meter 206 is in communication with the PLC 216 and measures the additive volume. An actuated valve to shut off flow is controlled by the PLC 216.

Thus, in the embodiment shown in FIG. 12, a solution may be produced at desired concentrations and, as the solution is transported to a holding tank, a desired ratio of additive based on volume of solution may be mixed with the solution. This ratio may be between 0 and 100%, as desired. The automated solution maker thus produces brine and has the ability to automatically mix and inject any ratio of additive into the solution.

Figure 16:
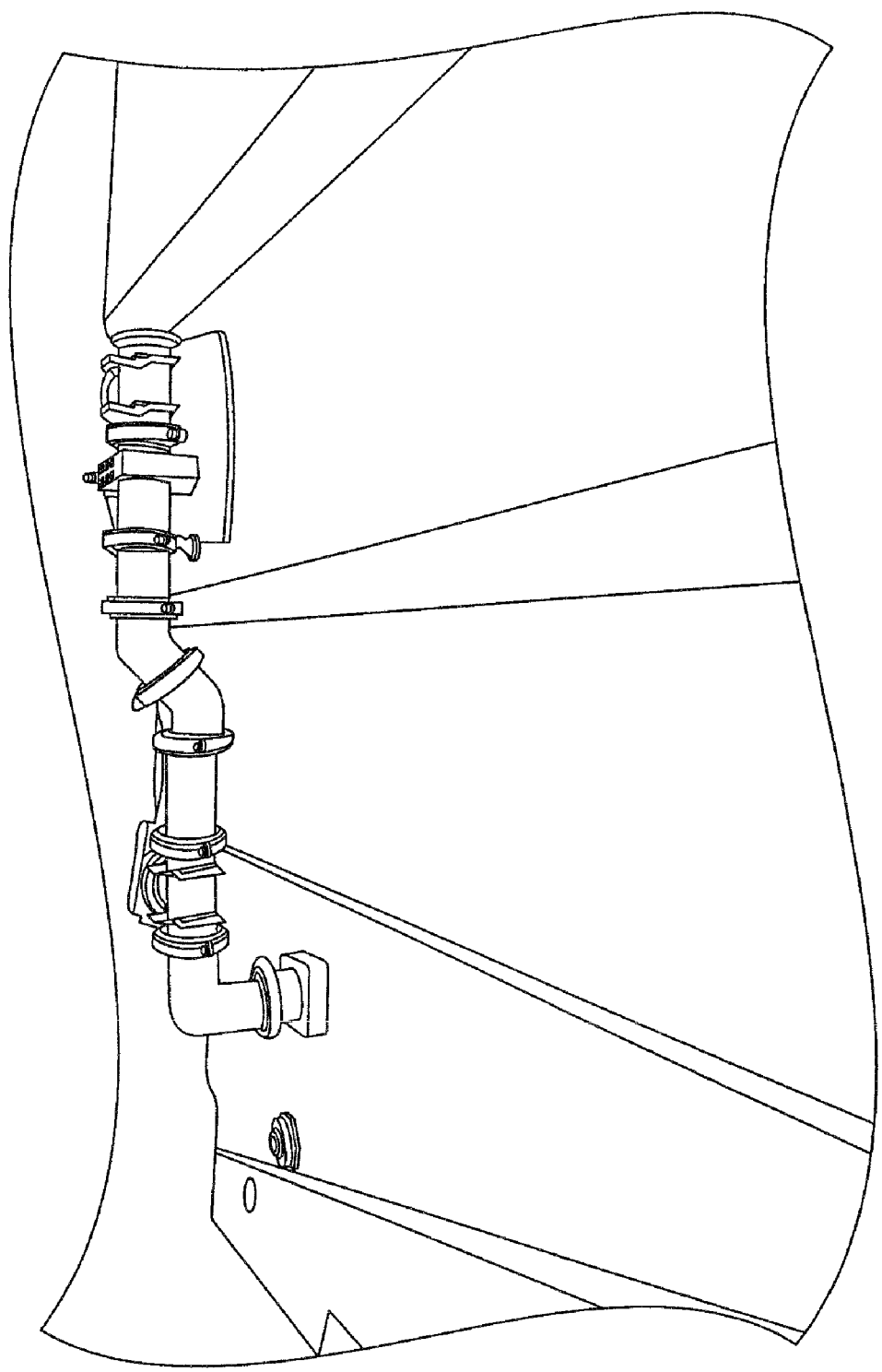
FIG. 16 illustrates a perspective view of a float assembly in accordance with one embodiment of the present invention.

FIG. 16 illustrates a perspective view of the float assembly on the hopper.

Figure 17:
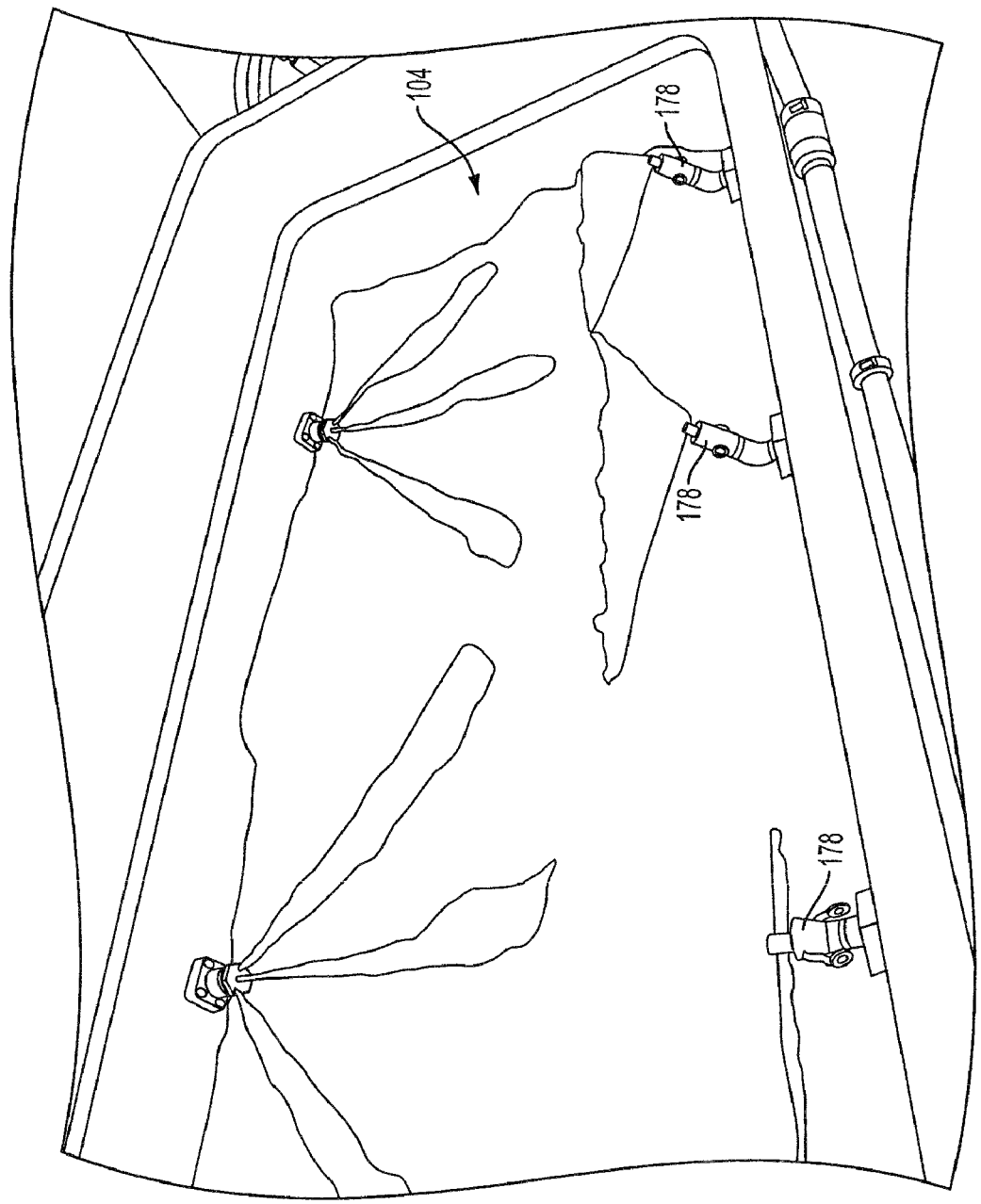
FIG. 17 illustrates solvent being added to a first portion of an automated solution maker in accordance with one embodiment of the present invention.
Figure 18:
FIG. 18 illustrates mixing of solvent with chemical in a first portion of an automated solution maker in accordance with one embodiment of the present invention.

FIG. 17 illustrates solvent being added to a first portion 104 of an automated solution maker via spray heads 178. FIG. 18 illustrates mixing of the solvent with the chemical in the first portion 104 of the automated solution maker.

Although the present invention has been described with reference to embodiments, persons skilled in the art will recognize that changes may be made in form and detail without departing from the spirit and scope of the invention.

The invention claimed is:

1. A method for automatically producing a solution, the method comprising:
depositing a chemical in a hopper;
adding a solvent to the hopper, wherein the chemical at least partially dissolves in the solvent to form a solution;
measuring a conductivity of the solution external to the hopper and correlating the conductivity of the solution to a concentration to establish a concentration of the solution;

comparing the concentration of the solution to a target concentration;

automatically diluting the solution if the solution is over-concentrated;

automatically increasing the concentration of the solution if the solution is under-concentrated by returning the solution to the hopper;

automatically diverting the solution to a storage tank if the solution concentration is within tolerance of the target concentration; and automatically flushing a deposit of foreign material from the hopper.

2. The method of claim 1, further comprising measuring a temperature of the solution and determining a temperature compensated concentration by weight of the solution.

3. The method of claim 1, further comprising pumping the solution from the hopper into an outlet tube, wherein the conductivity of the solution is measured in the outlet tube.

4. The method of claim 1, wherein automatically diluting the solution comprises adding solvent to the solution within an outlet tube and wherein automatically increasing the concentration of the solution comprises returning the solution to the hopper.

\* \* \* \* \*